United States Patent
Park

(10) Patent No.: US 10,683,693 B2
(45) Date of Patent: Jun. 16, 2020

(54) METHOD FOR MANUFACTURING VACUUM INSULATION GLASS PANEL AND DEVICE FOR CLOSING SEALING CAP

(71) Applicant: Je Il Park, Bucheon-si (KR)

(72) Inventor: Je Il Park, Bucheon-si (KR)

(*) Notice: Subject to any disclaimer, the term of this patent is extended or adjusted under 35 U.S.C. 154(b) by 0 days.

(21) Appl. No.: 16/314,814

(22) PCT Filed: Jul. 5, 2017

(86) PCT No.: PCT/KR2017/007131
§ 371 (c)(1),
(2) Date: Jan. 14, 2019

(87) PCT Pub. No.: WO2018/008958
PCT Pub. Date: Jan. 11, 2018

(65) Prior Publication Data
US 2019/0203523 A1    Jul. 4, 2019

(30) Foreign Application Priority Data

Jul. 6, 2016 (KR) .......... 10-2016-0085590
Aug. 16, 2016 (KR) .......... 10-2016-0103691

(51) Int. Cl.
*E06B 3/663* (2006.01)
*C03B 23/24* (2006.01)
(Continued)

(52) U.S. Cl.
CPC .......... *E06B 3/66342* (2013.01); *C03B 23/24* (2013.01); *C03C 27/06* (2013.01);
(Continued)

(58) Field of Classification Search
CPC .......... E06B 3/66342; E06B 3/67339; E06B 2003/66338; E06B 3/677; E06B 3/673;
(Continued)

(56) References Cited

U.S. PATENT DOCUMENTS

| 6,676,786 B1* | 1/2004 | Collins ............... E06B 3/6612 |
| | | 156/104 |
| 2002/0121111 A1* | 9/2002 | Yoshizawa ........ B32B 17/10972 |
| | | 65/34 |

(Continued)

FOREIGN PATENT DOCUMENTS

| JP | 2003-137612 A | 5/2003 |
| KR | 10-1157580 B1 | 6/2012 |

(Continued)

*Primary Examiner* — Patrick J Maestri
(74) *Attorney, Agent, or Firm* — Novick, Kim & Lee, PLLC; Jae Youn Kim

(57) ABSTRACT

Provided are a method for manufacturing a vacuum insulation glass panel and a device for closing a sealing cap, the method and the device being for exhausting air between two glass panels and sealing the same. The method for manufacturing a vacuum insulation glass panel, according to the present invention, heats the glass solder applied on the sealing cap before being put into a vacuum chamber, and then presses, by the operation of the elevating device, the sealing cap put into the vacuum chamber so as to join the sealing cap around the exhaust hole. The holder having the sealing cap is mounted in the clamping unit, and then the clamping unit is clamped to the glass panel assembly, thereby enabling the exhaust hole to be accurately closed with the sealing cap.

16 Claims, 26 Drawing Sheets

(51) Int. Cl.
  *E06B 3/677* (2006.01)
  *E06B 3/673* (2006.01)
  *E06B 3/66* (2006.01)
  *C03C 27/06* (2006.01)

(52) U.S. Cl.
  CPC ............ *E06B 3/66* (2013.01); *E06B 3/66333* (2013.01); *E06B 3/673* (2013.01); *E06B 3/677* (2013.01); *E06B 3/67304* (2013.01); *E06B 3/67339* (2013.01); *E06B 2003/66338* (2013.01); *Y02A 30/25* (2018.01); *Y02B 80/24* (2013.01)

(58) Field of Classification Search
  CPC ........ E06B 3/66; E06B 3/6612; E06B 3/6775; C03B 23/24; Y02B 80/24; Y02A 30/25
  See application file for complete search history.

(56) References Cited

U.S. PATENT DOCUMENTS

| | | | | |
|---|---|---|---|---|
| 2006/0154005 | A1* | 7/2006 | Misonou | C03C 27/10 428/34 |
| 2006/0175767 | A1* | 8/2006 | Collins | E06B 3/6612 277/644 |
| 2012/0304696 | A1* | 12/2012 | Miller | E06B 3/6775 65/32.2 |
| 2013/0302542 | A1* | 11/2013 | Jones | E06B 3/6612 428/34 |
| 2014/0037869 | A1* | 2/2014 | Petrmichl | E06B 3/6612 428/34 |
| 2014/0116516 | A1* | 5/2014 | Jones | F17D 5/00 137/1 |
| 2014/0144186 | A1* | 5/2014 | Li | E06B 3/6612 65/154 |
| 2017/0210111 | A1* | 7/2017 | Karam | B32B 17/06 |
| 2018/0238106 | A1* | 8/2018 | Sonderk R | E06B 3/6612 |

FOREIGN PATENT DOCUMENTS

| | | |
|---|---|---|
| KR | 10-2013-0076783 A | 7/2013 |
| KR | 10-1442030 B1 | 9/2014 |
| KR | 10-2014-0140046 A | 12/2014 |
| KR | 10-2014-0145449 A | 12/2014 |
| KR | 10-1611530 B1 | 4/2016 |

* cited by examiner

METHOD FOR MANUFACTURING VACUUM INSULATION GLASS PANEL AND DEVICE FOR CLOSING SEALING CAP

TECHNICAL FIELD

The present invention relates to a vacuum insulation glass panel, and more particularly, to a vacuum insulation glass panel manufacturing method for exhausting an air present between two glass panels and sealing a space between two glass panels, and a sealing cap closing apparatus.

BACKGROUND ART

A vacuum insulation glass panel is used as a window or an outer wall to improve the efficiency of heating and cooling of a building, a house or the like. The vacuum insulation glass panel includes two glass panels which are spaced apart from each other in parallel. The edges of the glass panels are sealed by a seal to keep the space between the two glass panels at a reduced pressure lower than the atmospheric pressure. The space between the glass panels is maintained by a plurality of spacers.

An opening or an exhaust hole is formed in any one of the glass panels to form a vacuum space between the glass panels by pumping out or exhausting an air. A glass tube is connected to the opening, and a vacuum device is connected to the glass tube. After evacuating the space by the operation of the vacuum device, the glass tube is sealed by melting to maintain the space in vacuum. However, the glass tube protrudes from the surface of the glass panel and may be damaged.

Korean Patent Application Publication No. 10-2013-0076783 discloses a vacuum insulation glass panel manufacturing method and a glass panel manufactured by the method. In the method of this patent document, a glass solder is applied around an opening formed in any one of two glass panels, and a glass or metal closing-off cap is arranged on the glass solder. The two glass panels are put into a vacuum oven, and an air is exhausted from the space between the glass plates through the opening. When the glass solder reaches a softening temperature, the closing-off cap is pressed by a plunger to seal the opening.

The vacuum insulation glass panel manufacturing method described above has various problems. First, since the closing-off cap is arranged and held above the opening by a member such as a spring or the like, the closing-off cap may be displaced or dropped during the movement of the glass panels. Thus, there is a possibility that the opening may not be accurately closed by the closing-off cap. Secondly, after the opening is closed by the closing-off cap, the member may remain inside the glass panels, thereby causing noise and breakage. Thirdly, since the position of the opening formed in the glass panels is changed depending on the size of the vacuum insulation glass panel, the setting of the plunger for pressing the closing-off cap is considerably complicated.

SUMMARY

The present invention is intended to solve the above-mentioned problems. An object of the present invention is to provide a novel vacuum insulation glass panel manufacturing method and a sealing cap closing apparatus capable of stably supporting a sealing cap for closing an exhaust hole of a glass panel an capable of accurately closing the exhaust hole.

Another object of the present invention is to provide a vacuum insulation glass panel manufacturing method and a sealing cap closing apparatus capable of closing an exhaust hole while preventing a foreign material such as a member for supporting a sealing cap from remaining in glass panels.

A further object of the present invention is to provide a vacuum insulation glass panel manufacturing method and a sealing cap closing apparatus capable of simplifying and automating a manufacturing process of glass panels having different sizes.

According to one aspect of the present invention, there is provided a vacuum insulation glass panel sealing cap closing apparatus. The vacuum insulation glass panel sealing cap closing apparatus includes: a clamping unit clamped to an edge of a glass panel assembly at a position adjacent to an exhaust hole formed in one edge of a lower surface of the glass panel assembly, the clamping unit having a guide hole formed so as to be aligned with the exhaust hole; a holder mounted in the guide hole so as to move along the guide hole and configured to hold a sealing cap to which a glass solder for closing the exhaust hole is applied; and an elevating means for moving the holder along the guide hole so as to press the sealing cap against a periphery of the exhaust hole so that the exhaust hole is closed by the sealing cap.

In the vacuum insulation glass panel sealing cap closing apparatus, the elevating means may be composed of a rack and pinion mechanism, a lever, a plunger, a cam mechanism or the like for smoothly pressing the sealing cap against a periphery of the exhaust hole.

According to another aspect of the present invention, there is provided a vacuum insulation glass panel manufacturing method, including: preparing a glass panel assembly having an exhaust hole formed in one of two glass panels with sealed edges; applying a glass solder to a sealing cap for closing the exhaust hole; causing the sealing cap to be held by a sealing cap closing apparatus for pressing the sealing cap against a periphery of the exhaust hole and then clamping the sealing cap closing apparatus to the glass panel assembly so that the sealing cap is disposed below the exhaust hole; heating the glass solder so that the glass solder is softened; putting the glass panel assembly into a vacuum chamber and then exhausting an air from the glass panel assembly; and bonding the glass solder to the periphery of the exhaust hole by pressing the sealing cap toward the exhaust hole by an operation of the sealing cap closing apparatus.

In the vacuum insulation glass panel manufacturing method and the sealing cap closing apparatus according to the present invention, the holder for holding the sealing cap is mounted on the clamping unit and then the clamping unit is clamped to the glass panel assembly, whereby the exhaust hole can be accurately closed by the sealing cap. Furthermore, by holding the sealing cap on the holder, the exhaust hole can be closed while preventing a foreign material such as a member for supporting the sealing cap from remaining in the glass panel assembly. Moreover, since the position of the holder mounted on the clamping unit can be easily set in accordance with the position of the exhaust hole, the manufacturing process of the glass panels having different sizes can be simplified and automated. In the vacuum insulation glass panel manufacturing method according to the present invention, the glass solder coated on the sealing cap can be heated before putting the sealing cap into the vacuum chamber. It is therefore possible to increase the heat energy efficiency.

DETAILED DESCRIPTION

Figure 1:
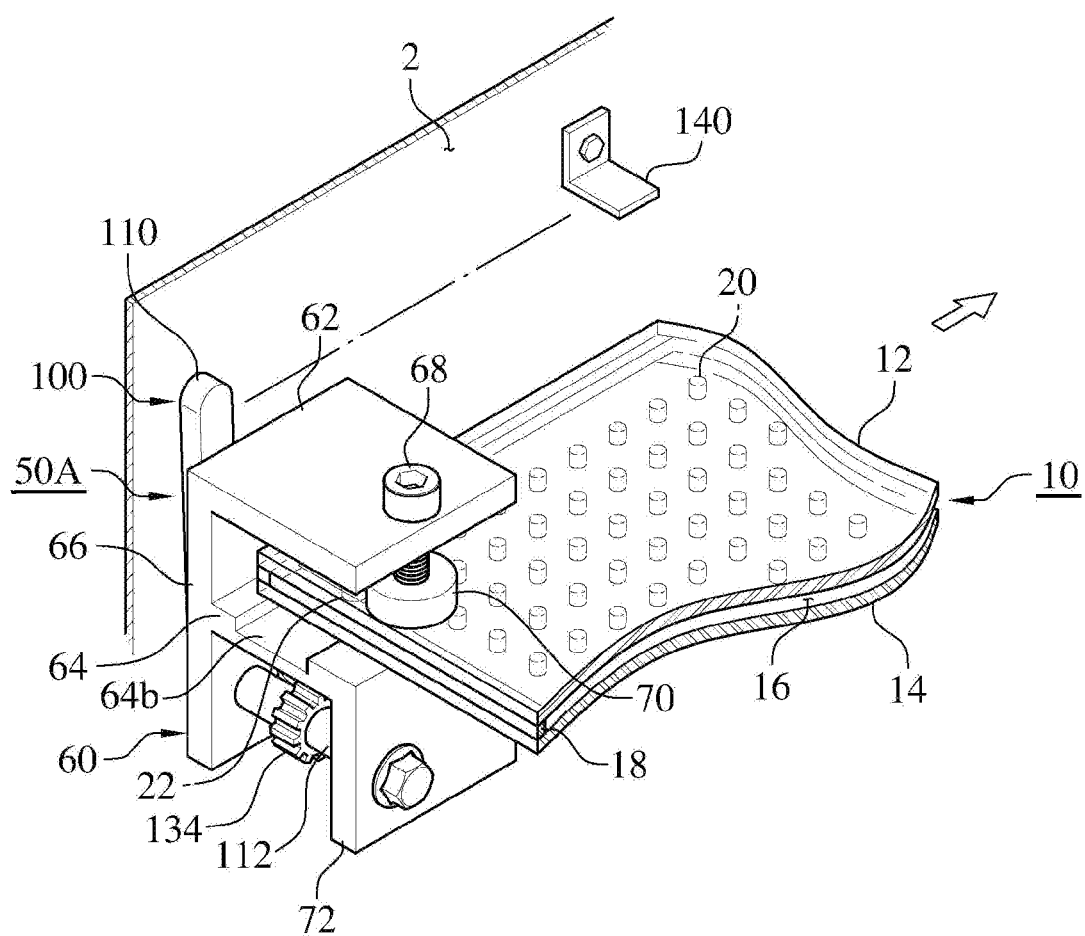
FIG. 1 is a perspective view showing a sealing cap closing apparatus of a first embodiment of the present invention.

Other objects, specific advantages and novel features of the present invention will become more apparent from the following detailed description of preferred embodiments given in conjunction with the accompanying drawings.

Hereinafter, preferred embodiments of a vacuum insulation glass panel sealing cap closing apparatus according to the present invention will be described in detail with reference to the accompanying drawings.

Referring first to FIGS. 1 to 5, there is shown a sealing cap closing apparatus according to a first embodiment of the present invention. Referring to FIGS. 1, 2, 4 and 5, the glass panel assembly 10 includes an upper glass panel 12 and a lower glass panel 14 facing each other in parallel across a gap left therebetween. The edges of the upper and lower glass panels 12 and 14 are sealed by a seal 18, for example, a glass solder, to maintain a space 16 between the upper and lower glass panels 12 and 14 in a vacuum (depressurized) state. In the case where the size of the glass panel assembly 10 is large, a plurality of spacers 20 for maintaining the gap between the upper and lower glass panels 12 and 14 and preventing the upper and lower glass panels 12 and 14 from being damaged is arranged in the space 16 between the upper and lower glass panels 12 and 14. The spacers 20 may be small glass pieces having a cylindrical columnar shape or a spherical shape.

Figure 2:
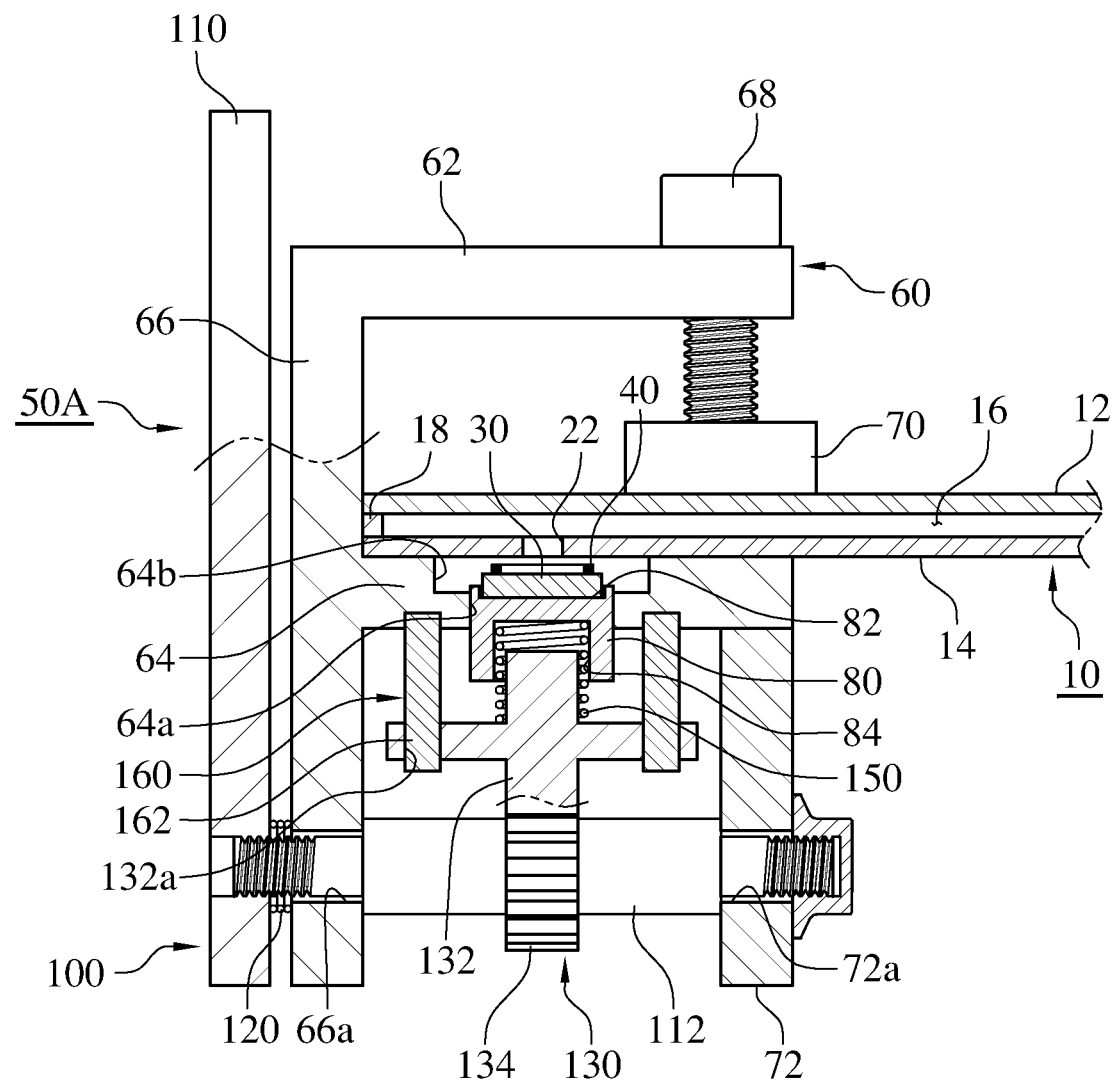
FIG. 2 is a partially cutaway front view showing the sealing cap closing apparatus according to the first embodiment of the present invention.
Figure 4:
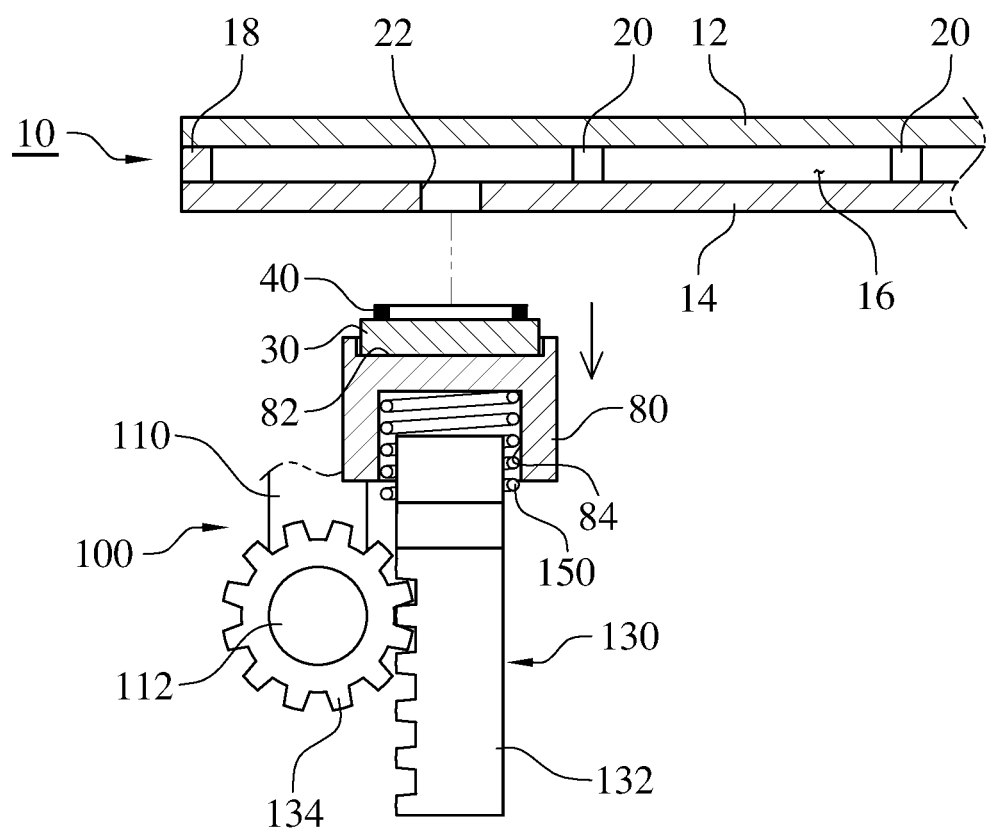
FIG. 4 is a partially sectional view for explaining the preparation state of a sealing cap in the sealing cap closing apparatus according to the first embodiment of the present invention.
Figure 5:
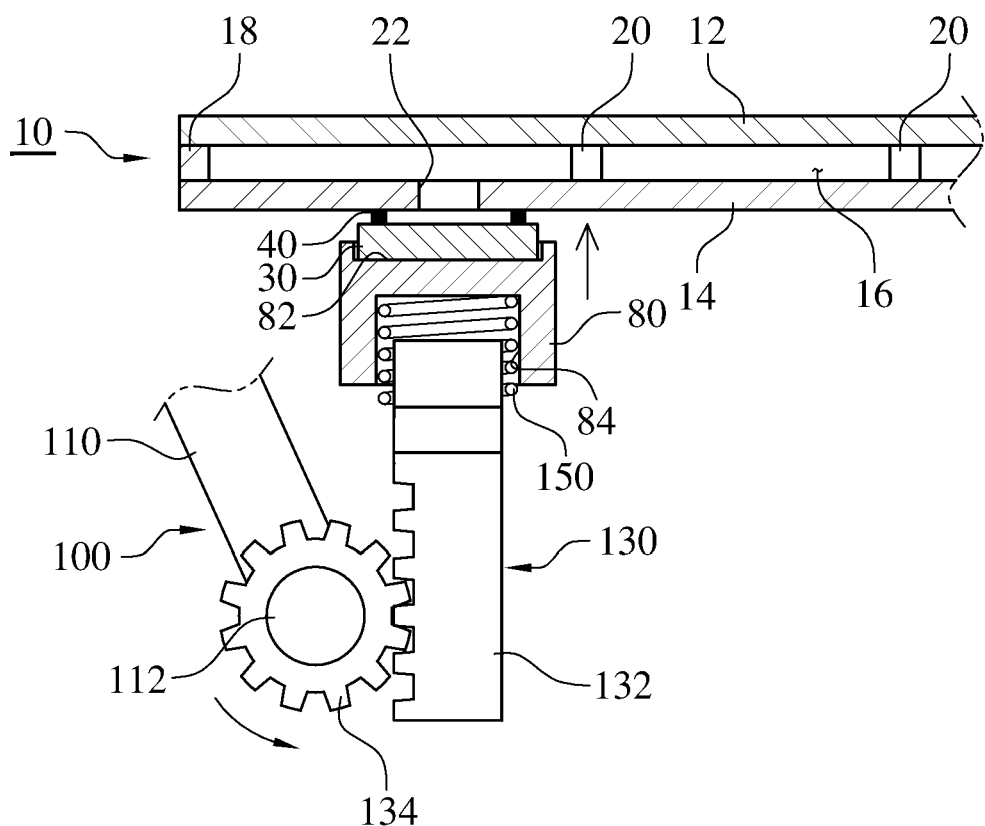
FIG. 5 is a partially cutaway front view showing the closed state of a sealing cap in the sealing cap closing apparatus according to the first embodiment of the present invention.

An exhaust hole 22 is formed at one edge of the lower glass panel 14 so as to communicate with the space 16 defined by the glass solder 16. In FIGS. 2, 4 and 5, one exhaust hole 22 is formed adjacent to one edge of the lower glass panel 14. However, a plurality of exhaust holes may be formed depending on the size of the glass panel. The exhaust hole 22 is closed by a sealing cap 30. The sealing cap 30 may be made of glass. A glass solder 40, for example, a frit, is applied to the upper surface of the sealing cap 30.

As shown in FIG. 1, the air exhaust in the glass panel assembly 10 is carried out in a vacuum chamber 2 or a process chamber or a vacuum oven. As well known in the art, a plurality of glass panel assemblies 10 is mounted on a tray and put into the vacuum chamber 2 by the operation of a conveyor. The vacuum chamber 2 may be a continuous type in which the glass panel assemblies 10 are continuously supplied or may be a batch type in which the glass panel assemblies 10 are intermittently supplied.

Figure 3:
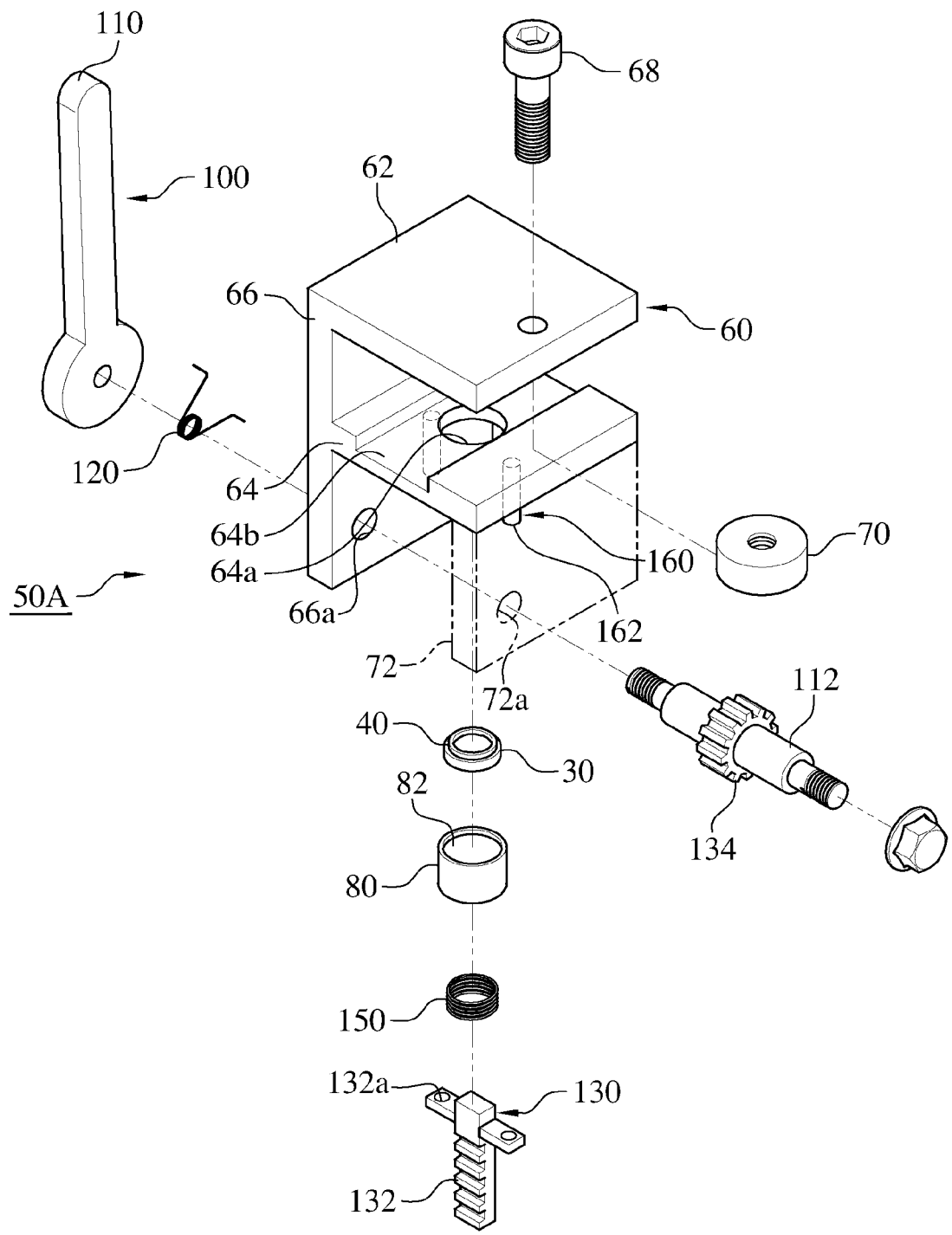
FIG. 3 is an exploded perspective view showing the sealing cap closing apparatus according to the first embodiment of the present invention.

Referring to FIGS. 1 to 3, the sealing cap closing apparatus 50A according to a first embodiment of the present invention presses the sealing cap 30 against the lower glass panel 14 around the exhaust hole 22 to close the exhaust hole 22 with the sealing cap 30. The sealing cap closing apparatus 50A of the first embodiment includes a clamping unit 60 for clamping the edge of the glass panel assembly 10 adjacent to the exhaust hole 22. The clamping unit 60 is composed of an upper plate 62, a lower plate 64, a joint plate 66 and a clamping screw 68.

The upper plate 62 is horizontally disposed above the upper glass panel 12 at a distance from the upper surface of the upper glass panel 12. The lower plate 64 is horizontally disposed below the lower glass panel 14 so as to be parallel to the upper plate 62. The upper surface of the lower plate 64 may be brought into contact with the lower surface of the lower glass panel 14. A guide hole 64a is formed at the center of the lower plate 64 so as to be aligned with the exhaust hole 22. An exhaust passage 64b is formed on the upper surface of the lower plate 64 so as to be connected to the guide hole 64a. The exhaust passage 64b is formed in a channel shape so as to smoothly exhaust an air through the exhaust hole 22.

The joint plate 66 connects one edge of the upper plate 62 and one edge of the lower plate 64. A shaft hole 66a is formed in the lower end portion of the joint plate 66 extending downward from the lower plate 64. The clamping screw 68 is fastened to the upper plate 62 so as to clamp the upper glass panel 12. A foot 70 is coupled to the lower end of the clamping screw 68 so as to support the upper surface of the upper glass panel 12. The lower plate 64 and the foot 70 are made of a material having low electrical conductivity and low thermal conductivity, for example, bismuth, so as to protect the glass panel assembly 10 from heat. A shaft bracket 72 is coupled to the lower surface of the lower plate 64 so as to face the joint plate 66 in a spaced-apart relationship with each other. A shaft hole 72a is formed in the lower end portion of the shaft bracket 72 so as to be aligned with the shaft hole 66a of the joint plate 66. In some embodiments, a pair of shaft brackets may be coupled to the lower surface of the lower plate 64 so as to face each other at an interval.

Referring to FIGS. 2 to 5, the sealing cap closing apparatus 50A according to the first embodiment of the present invention includes a holder 80 for holding the sealing cap 30 that closes the exhaust hole 22. The holder 80 is fitted to the guide hole 64a so as to be movable up and down along the guide hole 64a. A recess 80 for seating the sealing cap 30 is formed on the upper surface of the holder 80. A bore 84 is on the underside of the holder 80.

Referring to FIGS. 1 to 4, the sealing cap closing apparatus 50A according to the first embodiment of the present invention includes an elevating device 100 for lifting the holder 80 and pressing the sealing cap 30 held by the holder 80 against the lower glass panel 14 around the exhaust hole 22. The elevating device 100 includes a handle 110, a return spring 120, a rack and pinion mechanism 130 and a dog 140.

The handle 110 or the lever is mounted so as to be rotatable about a shaft 112 fitted to the shaft hole 66a of the joint plate 66 and the shaft hole 72a of the shaft bracket 72. The return spring 120 applies an elastic force to the handle 110 so that the handle 110 can be returned to an initial position. The return spring 120 may be a torsion spring mounted on the shaft 112 so as to connect the joint plate 66 and the handle 110. Alternatively, the return spring 120 may be a coil spring connected between the joint plate 66 and the handle 110.

The rack and pinion mechanism 130 converts the rotary motion of the handle 110 into a linear motion to move the holder 80 up and down. The rack and pinion mechanism 130 includes a rack 132 vertically movably arranged below the holder 80 to lift and lower the holder 80, and a pinion 134 mounted on the shaft 112 of the handle 110 to mesh with the pinion 132. The upper portion of the rack 132 is inserted into the bore 84. The pinion 134 is rotated together with the handle 110 to lift and lower the rack 132, thereby lifting and lowering the holder 80. In some embodiments, the pinion 134 may be mounted on the lower end portion of the handle 110. Alternatively, the pinion 134 may be a sector gear formed on the lower end portion of the handle 110 or on the outer surface of the shaft 112. The rack 132 may be coupled to the holder 80 or may be integrally formed with the holder 80.

The holder 80 and the rack 132 are made of a material having thermal conductivity higher than the thermal conductivity of the portions making contact with the glass panel assembly 10, i.e., the lower plate 64 and the foot 70, for example, oxygen-free copper, quartz glass or the like. In this way, the thermal conductivity of the portion making contact with the glass panel assembly 10 is set lower than the thermal conductivity of the holder 80 and the rack 132 as components for heating the glass solder 40, whereby it is possible to prevent the glass panel assembly 10 from being damaged by reducing the heat transmitted to the glass panel assembly 10 when heating the glass solder 40.

A dog 140 is mounted on one side of the vacuum chamber 2 so as to rotate the handle 80 after exhausting an air from the glass panel assembly 10. In FIG. 1, the dog 140 is shown in the form of a plate mounted on the inner surface of the vacuum chamber 2. However, this is exemplary and the dog 140 may be a round bar, a pin, a bracket, or the like.

The elevating device 100 further includes a coil spring 150 mounted between the holder 80 and the rack 132. The upper portion of the coil spring 150 is accommodated in the bore 84. The coil spring 150 absorbs the impact acting on the holder 80 and the rack 132. In some embodiments, the coil spring 150 may be configured to elastically bias the holder 80 in such a direction that the sealing cap 30 lying in the recess 82 is moved away from the lower surface of the lower glass panel 14 by the elastic force of the coil spring 150.

Referring to FIGS. 2 and 3, the elevating device 100 further includes a pair of guide bars 162 as a linear guide 160 for guiding the vertical movement of the rack 132. The guide bars 162 are vertically coupled to both sides of the lower plate 64. The guide bars 162 are inserted into a pair of guide holes 132a formed on both sides of the rack 132 to guide the vertical movement of the rack 132 in a linear motion. In some embodiments, the linear guide may be a monorail type including a guide rail mounted to the lower plate 64 and a slider mounted on the rack 132 so as to be slidable along the guide rail.

Hereinafter, the operation of the sealing cap closing apparatus according to the first embodiment of the present invention having such a configuration will be described.

Referring to FIGS. 1, 2 and 4, after the glass solder 40 is applied to the edge of the upper surface of the sealing cap 30, the sealing cap 30 is seated in the recess 82 of the holder 80. The sealing cap closing apparatus 50A in which the sealing cap 30 is held in the holder 80 is clamped to the glass panel assembly 10 by the clamping unit 60. If the clamping screw 68 is fastened after the edge of the plate glass assembly 10 having the exhaust hole 22 is sandwiched between the upper and lower plates 62 and 64, the foot 70 is supported on the upper surface of the upper glass panel 12 and the lower plate 64 is supported on the lower surface of the lower glass panel 14, whereby the glass panel assembly 10 is clamped to the clamping unit 60. The sealing cap 30 is away from the exhaust hole 22 at the initial position of the handle 110. The clamping unit 60 is clamped to the glass panel assembly 10 in the state in which the sealing cap 30 is held in the holder 80, whereby the sealing cap 30 can be easily and accurately set so that the exhaust hole 22 and the sealing cap 30 are aligned with each other. Therefore, it is possible to simplify the manufacturing process of vacuum insulation glass panels having different sizes.

Subsequently, when the clamping of the glass panel assembly 10 is completed, the glass solder 40 is heated and softened. The glass solder 40 may be softened by the radiant heat generated by the heating operation of a heater in a separate heating chamber isolated from the vacuum chamber 2. By heating the glass solder 40 before the glass panel assembly 10 is put into the vacuum chamber 2, it is possible to increase the heat energy efficiency as compared with a case where the glass solder 40 is heated by the radiation heat in the vacuum chamber 2.

After the glass solder 40 is softened, the glass panel assembly 10 is mounted on the tray of a conveyor and put into the vacuum chamber 2. When the glass panel assembly 10 put into the vacuum chamber 2, the vacuum chamber 2 is evacuated into vacuum. The air in the glass panel assembly 10 is exhausted to the outside of the vacuum chamber 2 through the exhaust hole 22 and the exhaust passage 64b. During the exhaust, the glass panel assembly 10 can be translated along the vacuum chamber 2 by the operation of the conveyor.

Referring to FIGS. 1, 2 and 5, after exhausting an air from the glass panel assembly 10, the glass panel assembly 10 is translated toward the front side of the vacuum chamber 2 by the operation of the conveyor. The handle 110 of the elevating device 100 is caught by the dog 140 and rotated as the glass panel assembly 10 is translated. The pinion 134 is rotated together with the handle 110 to lift the rack 132. As the rack 132 is lifted, the coil spring 150 is compressed to lift the holder 80. The holder 80 is moved upward along the guide hole 64a to press the sealing cap 30 against the glass panel assembly 10 around the exhaust hole 22. Thus, the softened glass solder 40 is bonded to the glass panel assembly 10 around the exhaust hole 22, whereby the sealing cap 30 completely closes the exhaust hole 22.

Subsequently, after the exhaust hole 22 is closed by the sealing cap 30, the glass panel assembly 10 is discharged to the outside of the vacuum chamber 2 by the operation of the conveyor. The handle 110 is returned to the initial position by the elastic force of the return spring 129 while passing through the dog 140. The pinion 134 is rotated and the rack 132 is lowered while returning the handle 110 to the initial position. The holder 80 is lowered and returned to the initial position by the lowering of the rack 132. The sealing cap 30 can be pressed against the glass panel assembly 10 around the exhaust hole 22 by the operation of the elevating device 100 in the vacuum chamber 2. It is therefore possible to easily automate the manufacturing process of the glass panel assembly 10. Furthermore, the sealing cap closing apparatus 50A can be operated by the contact between the handle 110 and the dog 140 regardless of the position of the exhaust hole 22. Therefore, a plurality of glass panel assemblies 10 having different sizes can be placed on a conveyor and put into the vacuum chamber 2. Accordingly, it is possible to easily manufacture a small number of various types of glass panel assemblies 10 and to easily automate the manufacturing process.

Figure 6:
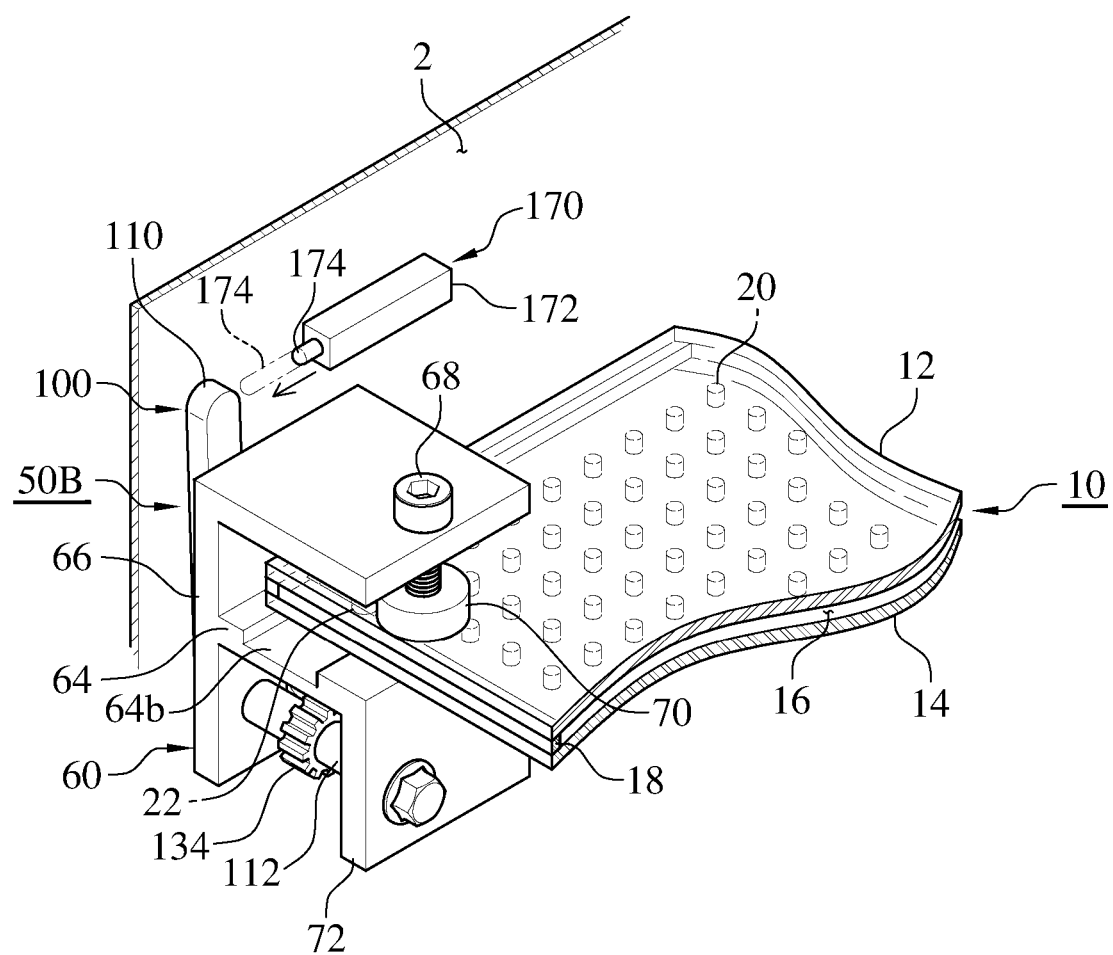
FIG. 6 is a perspective view showing a sealing cap closing apparatus according to a second embodiment of the present invention.

FIG. 6 shows a sealing cap closing apparatus according to a second embodiment of the present invention. Referring to FIG. 6, the difference between the sealing cap closing apparatus 50B of the second embodiment and the sealing cap closing apparatus 50A of the first embodiment described above is that a pushing actuator 170 is mounted so as to rotate the handle 110 in the vacuum chamber 2. The pushing actuator 170 includes an actuator 172 and a pusher 174 connected to the actuator 172 so as to rotate the handle 110. The pushing actuator 172 may be variously configured by a pneumatic rod-less linear actuator, a solenoid actuator, a lead screw linear actuator, a belt driven linear actuator, or the like.

In the case where the vacuum chamber 2 is of a batch type, the glass panel assembly 10 put into the batch type vacuum chamber is not moved forward but is stopped. After exhausting an air from the glass panel assembly 10, the pusher 174 is moved forward by the operation of the actuator 172 to rotate the handle 110. The rack and pinion mechanism 130 are interlocked with the rotation of the handle 110, whereby the holder 80 is lifted to press the sealing cap 30 against the glass panel assembly 10 around the exhaust hole 22, thereby closing the exhaust hole 22. After the closing of the exhaust hole 22 by the sealing cap 30 is completed, the pusher 174 is moved backward by the operation of the actuator 172 to return the handle 110.

FIGS. 7 to 10 show a sealing cap closing apparatus according to a third embodiment of the present invention. Referring to FIGS. 7 to 10, the same components of the sealing cap closing apparatus 50C of the third embodiment as those of the sealing cap closing apparatuses 50A and 50B of the second and third embodiments are denoted by like reference numerals, and the detailed description thereof is omitted. The elevating device 200 includes a lever 210, a return spring 220 and a dog 230 for lifting and lowering the holder 80. The lever 210 is mounted on one side of the clamping unit 60 so as to be rotatable about the shaft 212. The lever 210 has a pressing portion 214 extending from the lower end thereof so as to lift the holder 80. A boss 216 is formed on the upper surface edge of the pressing portion 214. When the lever 210 is rotated, the pressing portion 214 supports the lower end of the holder 80 to move the holder 80 up and down. In some embodiments, the lever 210 may be configured such that the distal end thereof is caught in one side of the holder 80, e.g., a groove or a hole, to lift the holder 80.

The return spring 220 is constituted by a torsion spring mounted on the shaft 212 to return the lever 210 to the initial position. The dog 230 is attached to one side of the vacuum chamber 2 so as to rotate the lever 210 after exhausting an air from the glass panel assembly 10. When the vacuum chamber 2 is of a batch type, the dog 230 may be replaced with the pushing actuator 170 described above. A coil spring 240 is further mounted between the holder 80 and the pressing portion 214 so as to absorb the impact acting on the holder 80. The coil spring 240 is received in the bore 84 of the holder 80. The boss 216 is fitted to the coil spring 240. In some embodiments, the coil spring 240 may be mounted inside the guide hole 64a so as to elastically bias the holder 80 downward.

Figure 7:
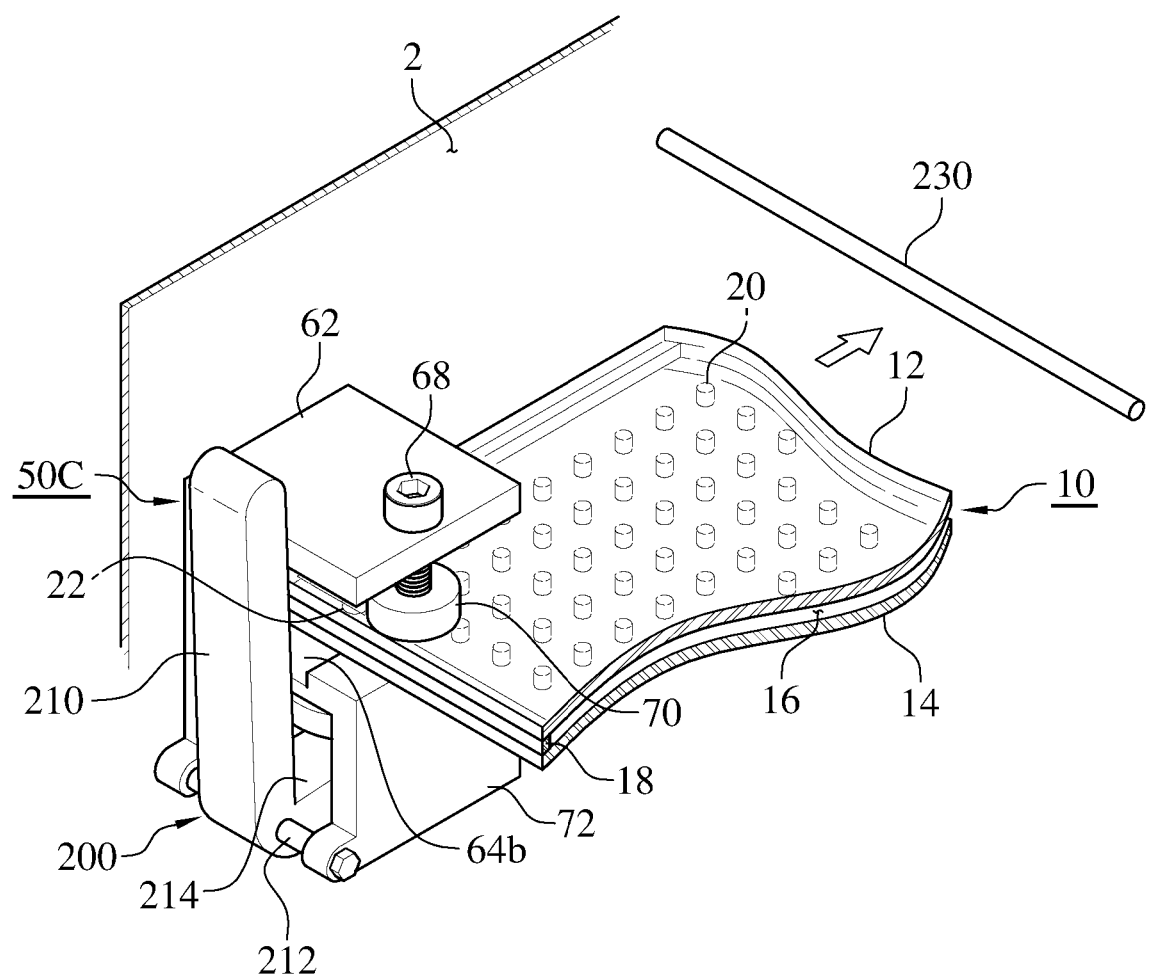
FIG. 7 is a perspective view showing a sealing cap closing apparatus according to a third embodiment of the present invention.
Figure 8:
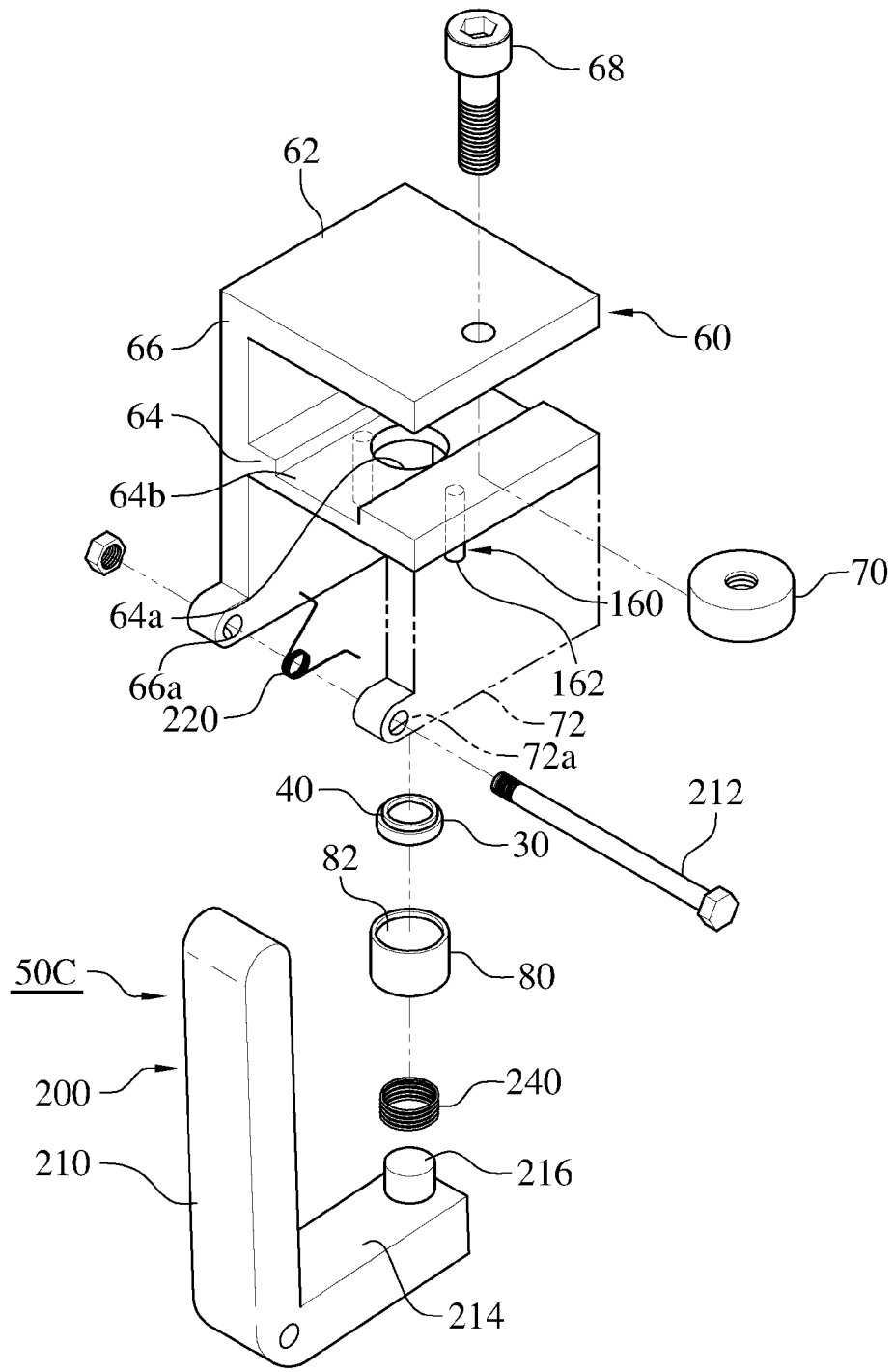
FIG. 8 is an exploded perspective view showing the sealing cap closing apparatus according to the third embodiment of the present invention.
Figure 9:
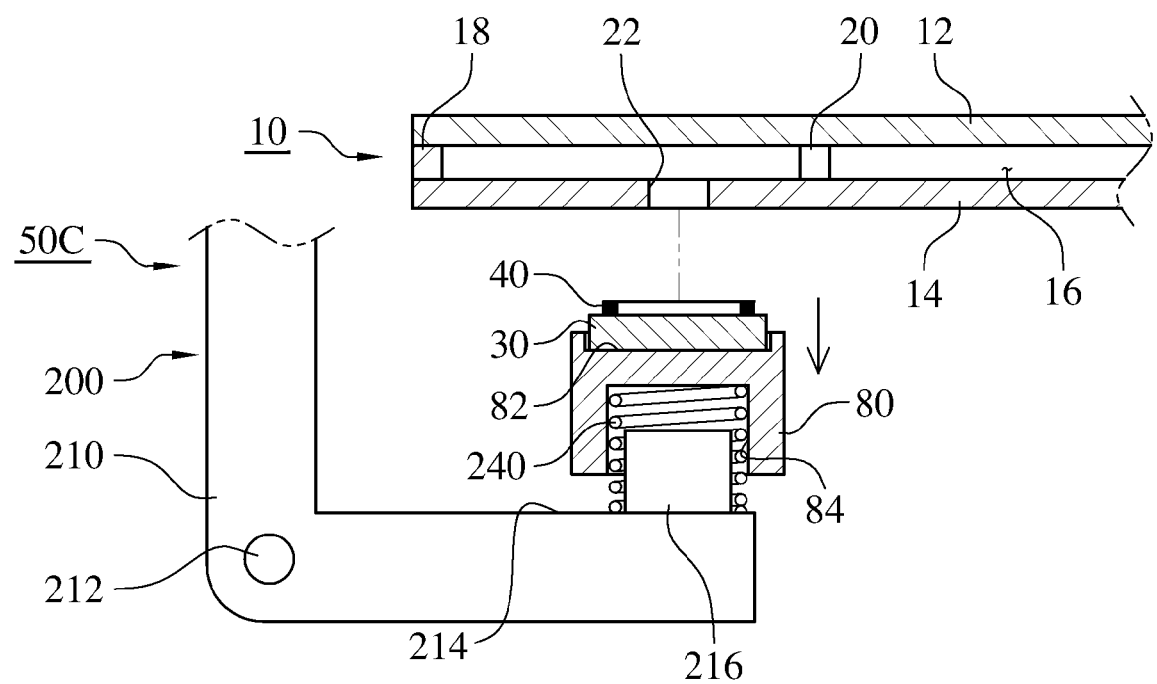
FIG. 9 is a partially sectional view for explaining the preparation state of a sealing cap in the sealing cap closing apparatus according to the third embodiment of the present invention.
Figure 10:
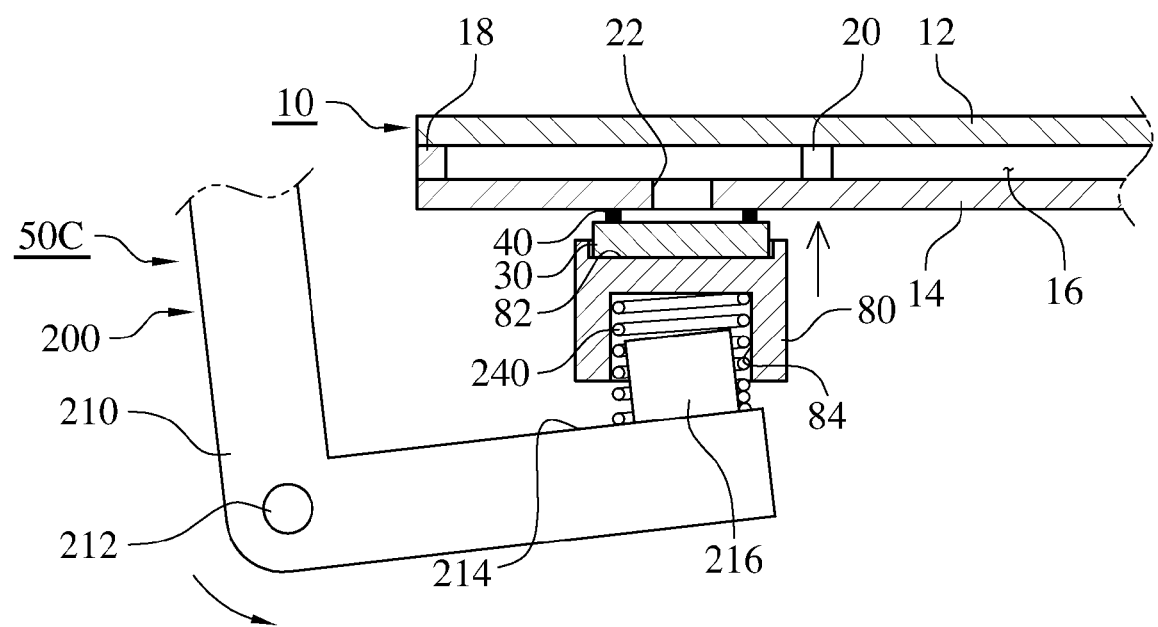
FIG. 10 is a partially cutaway front view showing the closed state of the sealing cap in the sealing cap closing apparatus according to the third embodiment of the present invention.
Figure 11:
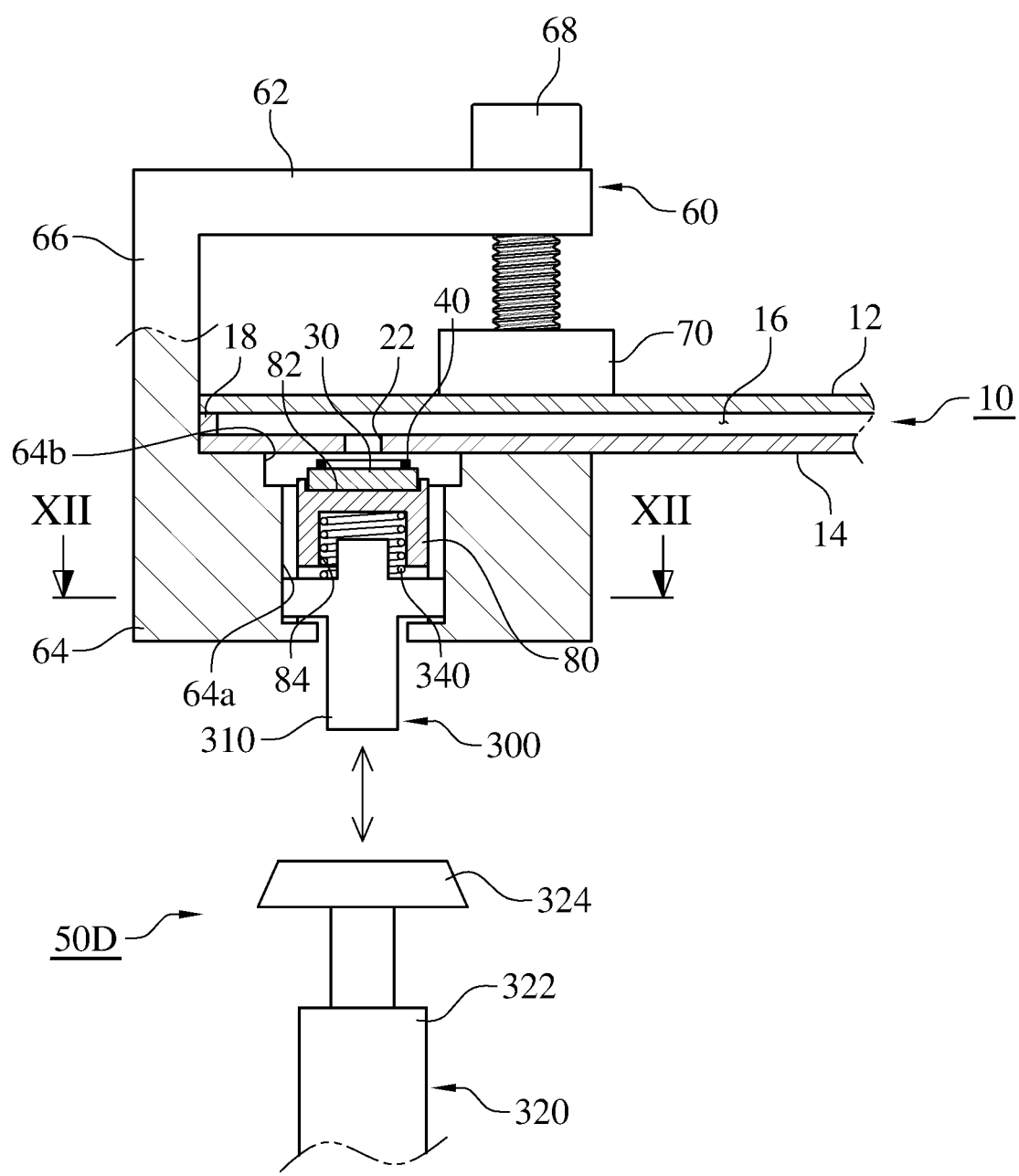
FIG. 11 is a partially cutaway front view showing a sealing cap closing apparatus according to a fourth embodiment of the present invention.
Figure 12:
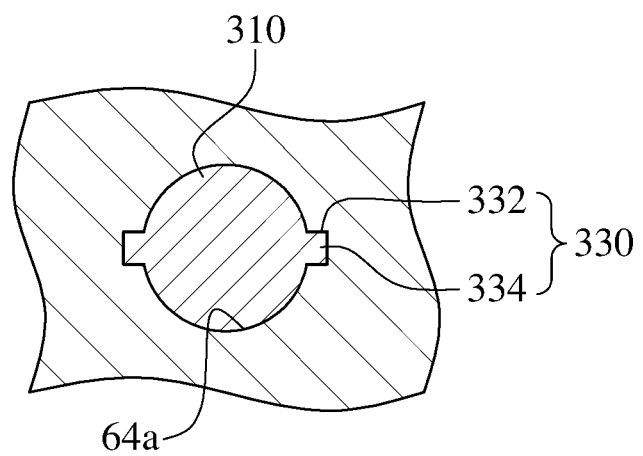
FIG. 12 is a sectional view taken along line XII-XII in FIG. 11.
Figure 13:
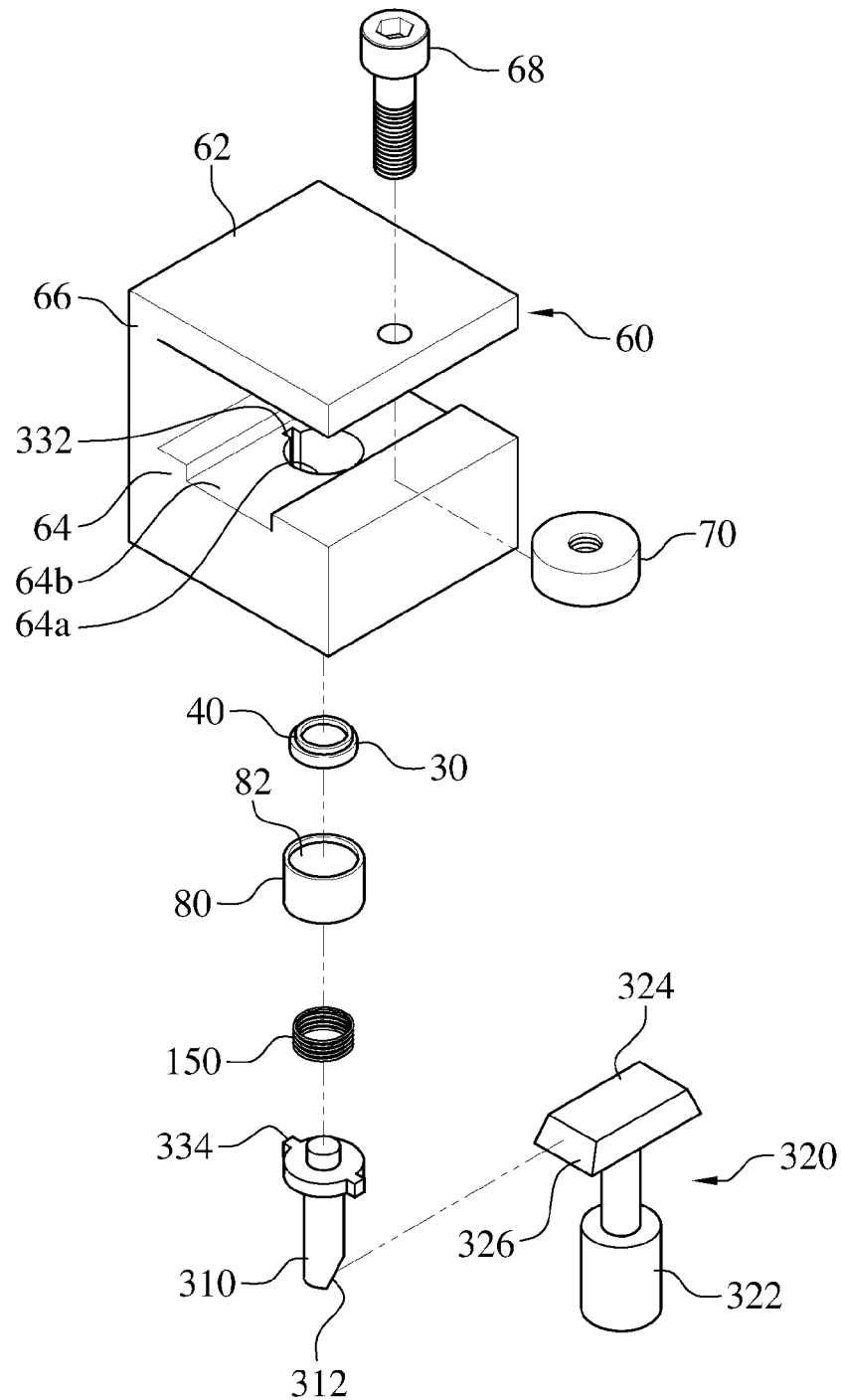
FIG. 13 is a perspective view showing the sealing cap closing apparatus according to the fourth embodiment of the present invention.

Referring to FIGS. 7, 9 and 10, when the lever 210 is caught and rotated by the dog 230 while the glass panel assembly 10 is translated in the vacuum chamber 2, the pressing portion 210 lifts the holder 80 while compressing the coil spring 240. The holder 80 is lifted along the guide hole 64a to press the sealing cap 30 against the glass panel assembly 10 around the exhaust hole 22. Thus, the softened glass solder 40 is bonded to the glass panel assembly 10 around the exhaust hole 22, whereby the sealing cap 30 completely closes the exhaust hole 22.

FIGS. 11 to 15 show a sealing cap closing apparatus according to a fourth embodiment of the present invention. Referring to FIGS. 11 to 15, the same components of the sealing cap closing apparatus 50D of the fourth embodiment as those of the sealing cap closing apparatus 50A of the first embodiment are denoted by like reference numerals and the detailed description thereof is omitted. The elevating device 300 includes a plunger 310 and a pushing actuator 320 for lifting and lowering the holder 80. The plunger 310 is fitted to the guide hole 64a so as to be movable up and down along the guide hole 64a. The lower end of the plunger 310 protrudes downward from the guide hole 64a. An inclined contact surface 312 is formed at the lower end of the plunger 310.

The pushing actuator 320 is mounted inside the vacuum chamber 2 so that the plunger 310 can be lifted and lowered under the glass panel assembly 10 put into the vacuum chamber 2. The pushing actuator 320 includes an actuator 322 mounted inside the vacuum chamber 2 so as to be disposed below the glass panel assembly 10, and a pusher 324 connected to the actuator 322 to move the plunger 310 up and down. The pusher 324 has an inclined contact surface 326 formed so as to make contact with the inclined contact surface 312 of the plunger 310 in a corresponding relationship. When the glass panel assembly 10 is translated toward the front side of the vacuum chamber 2 with the pusher 324 lifted by the operation of the actuator 322, the inclined contact surface 312 of the plunger 310 makes contact with the inclined contact surface 326 of the plunger 324 to lift the plunger 310. In some embodiments, the pushing actuator 320 may be configured so that the pusher 324 is lifted to move the plunger 310 upward when the glass panel assembly 10 is stopped at a set position inside the vacuum chamber 2.

The elevating device 300 further includes a linear guide 330 for guiding the linear movement of the plunger 310. The linear guide 330 has a guide groove 332 formed along the axial direction on the inner surface of the guide hole 64a, and a slider 334 formed on the outer surface of the plunger 310 so as to slide along the guide groove 332. In some embodiments, the linear guide 330 may be replaced by planar surfaces formed in the guide hole 64a and the plunger 310 in a corresponding relationship to make contact with each other so that the linear motion of the plunger 310 is guided.

The elevating device 300 includes a coil spring 340 further mounted between the holder 80 and the plunger 310 so as to absorb the impact applied to the holder 80. In some embodiments, the coil spring 340 may be mounted inside the guide hole 64a so as to elastically bias the holder 80 or the plunger 310 downward. FIGS. 11 and 13 to 15 show that the holder 80 and the plunger 310 are separated from each other. However, this is exemplary. The holder 80 and the plunger 310 may be integrally formed or combined with each other. In this case, the coil spring 340 is mounted inside the guide hole 64a so as to elastically bias the plunger 310 downward.

Figure 14:
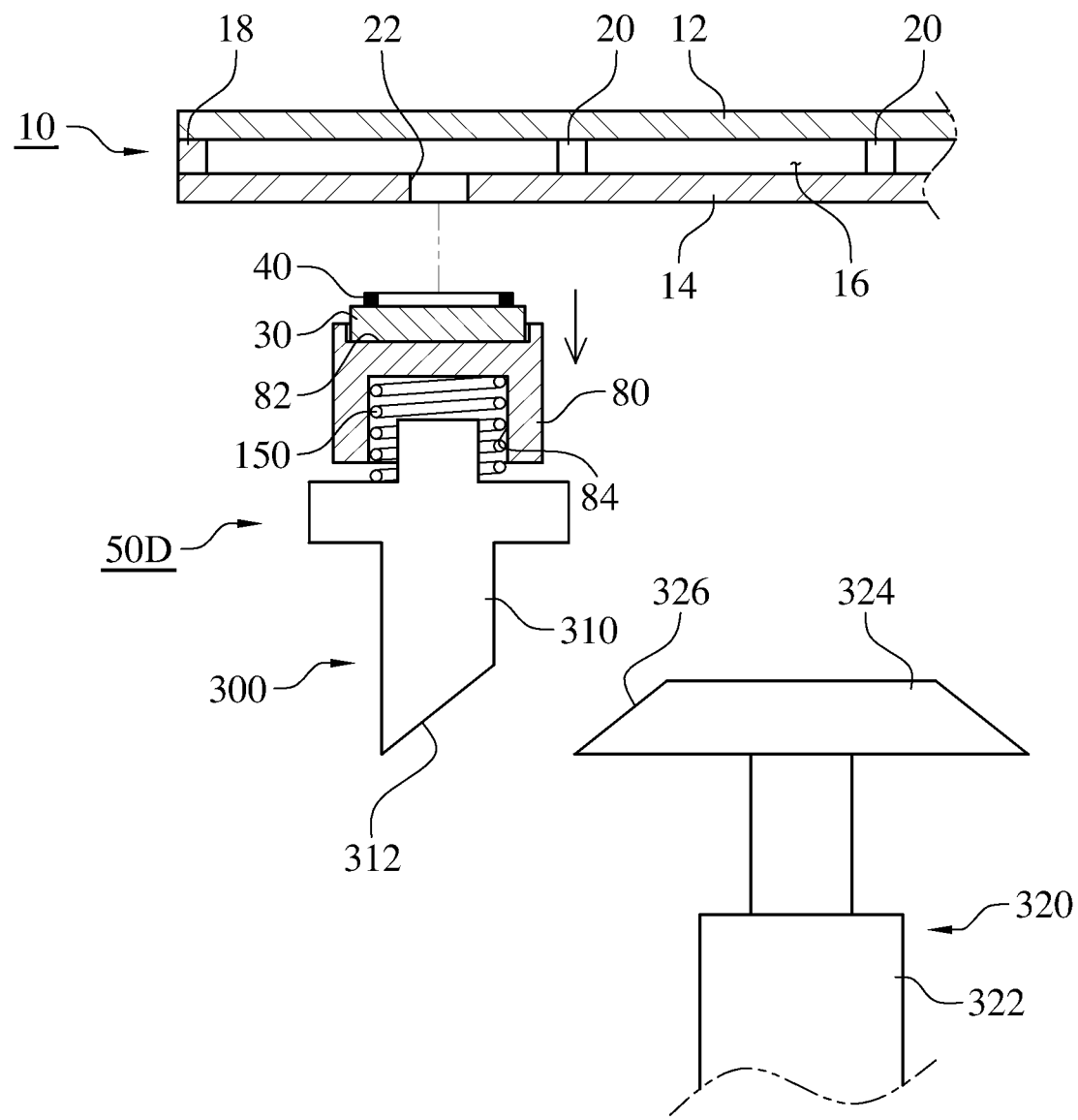
FIG. 14 is a partial sectional view for explaining the preparation state of a sealing cap in the sealing cap closing apparatus according to the fourth embodiment of the present invention.
Figure 15:
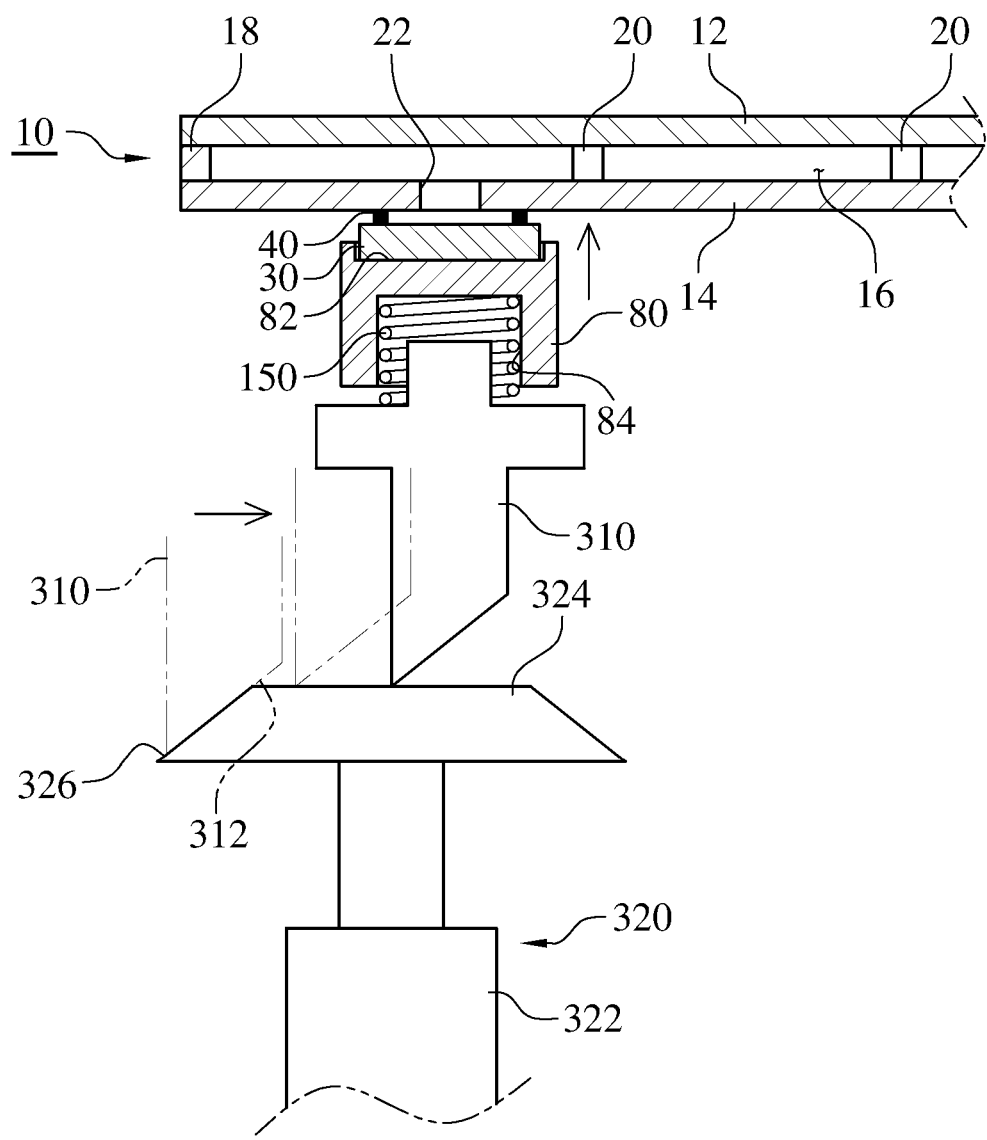
FIG. 15 is a partially cutaway front view showing the closed state of the sealing cap in the sealing cap closing apparatus according to the fourth embodiment of the present invention.

Referring to FIGS. 14 and 15, when the glass panel assembly 10 is put into the vacuum chamber 2 and the exhaust is completed, the pusher 324 is lifted by the operation of the actuator 322. If the glass panel assembly 10 is translated toward the front side of the vacuum chamber 2 by the operation of the conveyor, the inclined contact surface 312 of the plunger 310 makes contact with the inclined contact surface 326 of the pusher 324, thereby lifting the plunger 310. As the plunger 310 is lifted, the coil spring 340 is compressed to lift the holder 80. The holder 80 is lifted along the guide hole 64a to press the sealing cap 30 against the glass panel assembly 10 around the exhaust hole 22. Thus, the softened glass solder 40 is bonded to the glass panel assembly 10 around the exhaust hole 22, whereby the sealing cap 30 completely closes the exhaust hole 22. When the plunger 310 moves past the pusher 324, the pusher 324 is lowered by the operation of the actuator 322 and is returned to the initial position.

Figure 16:
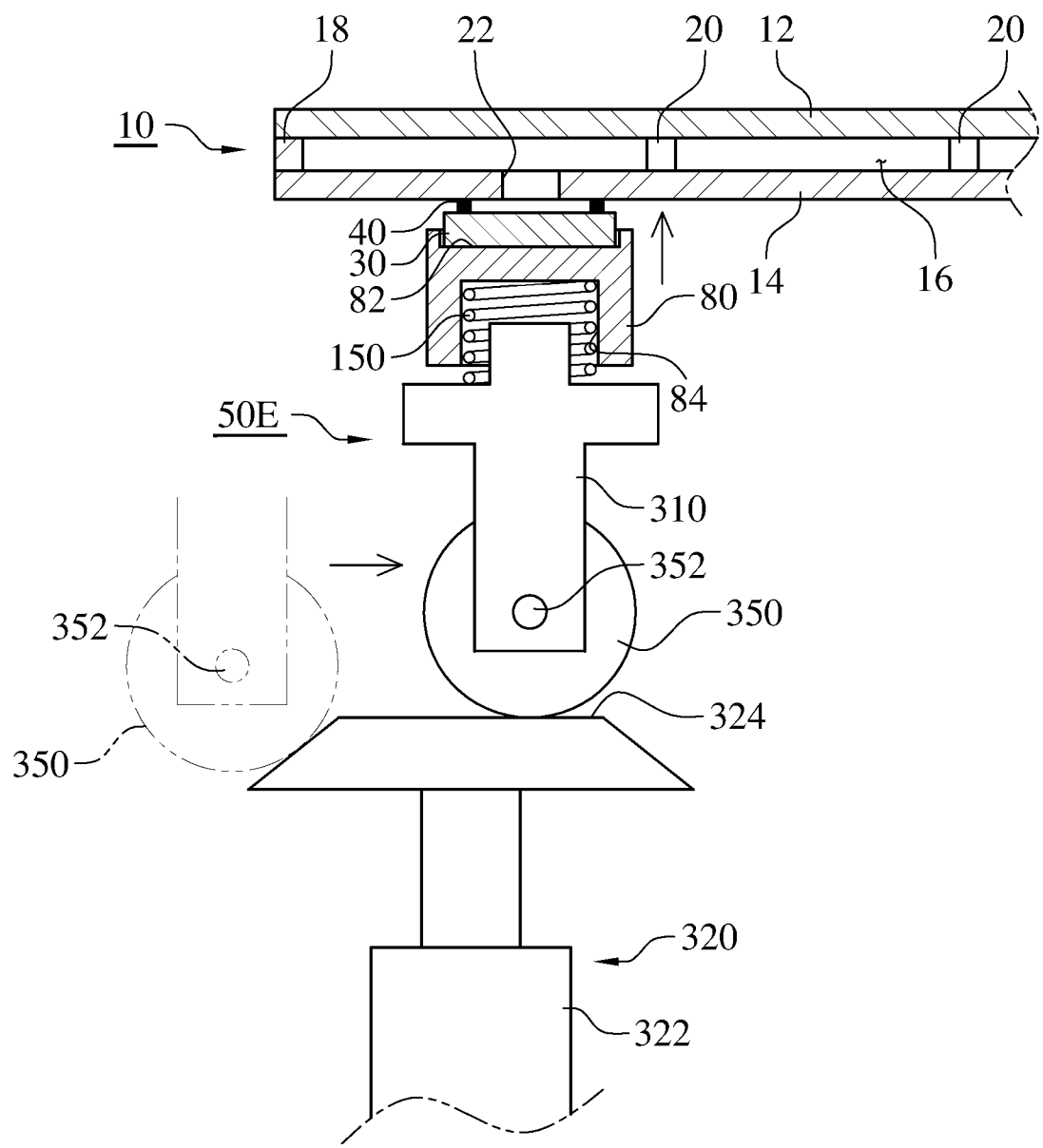
FIG. 16 is a partially cutaway front view showing the closed state of a sealing cap in a sealing cap closing apparatus according to a fifth embodiment of the present invention.

FIG. 16 shows a sealing cap closing apparatus according to a fifth embodiment of the present invention. Referring to FIG. 16, the difference between the sealing cap closing apparatus 50E of the fifth embodiment and the sealing cap closing apparatus 50D of the fourth embodiment described above is that a roller 350 for rolling contact with the pusher 324 is mounted on the lower end portion of the plunger 310. The roller 350 is rotated about the shaft 352 when making contact with the pusher 324, thereby reducing the frictional resistance. Therefore, the plunger 310 can be smoothly moved up and down by the pusher 324.

FIGS. 17 to 23 show a sealing cap closing apparatus according to a sixth embodiment of the present invention. Referring to FIGS. 17, 18 and 20 to 23, the same components of the sealing cap closing apparatus 50F of the sixth embodiment as those of the sealing cap closing apparatus 50A of the first embodiment are denoted by like reference numerals and the detailed description thereof is omitted. The sealing cap closing apparatus 50F of the sixth embodiment includes a cam mechanism 400 as a lift device for pressing the sealing cap 30 held by the holder 80 against the glass panel assembly 10 around the exhaust hole 22.

Figure 19A:
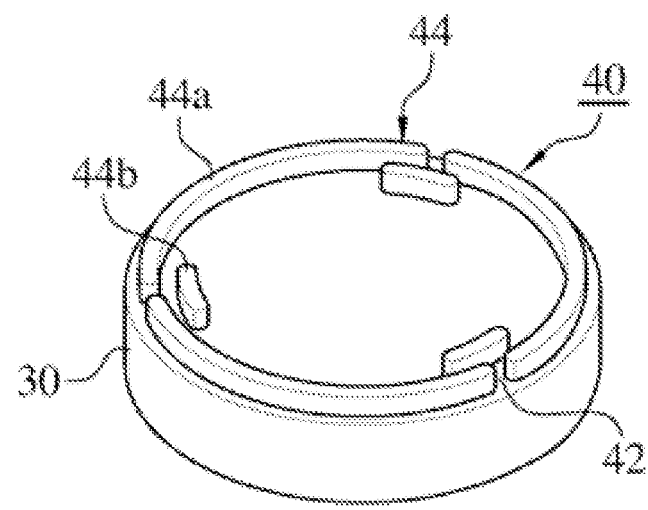
FIGS. 19A to 19C are perspective view showing other examples of the sealing cap in the sealing cap closing apparatus according to the sixth embodiment of the present invention.
Figure 19B:
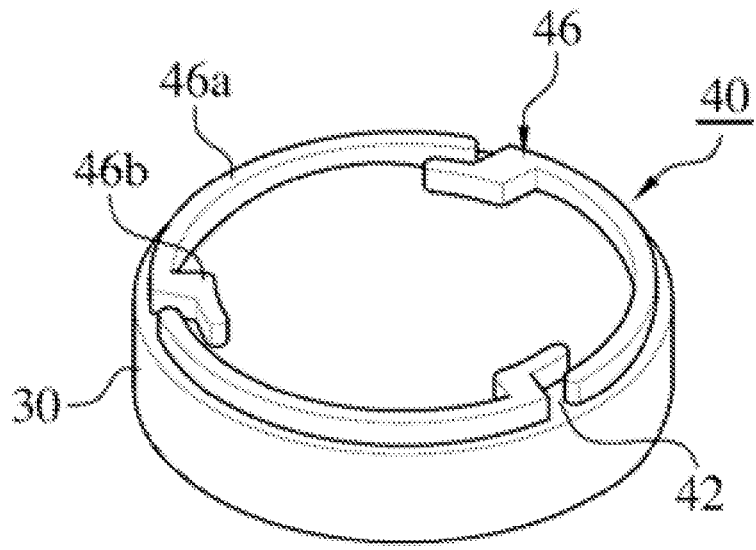
Figure 19C:
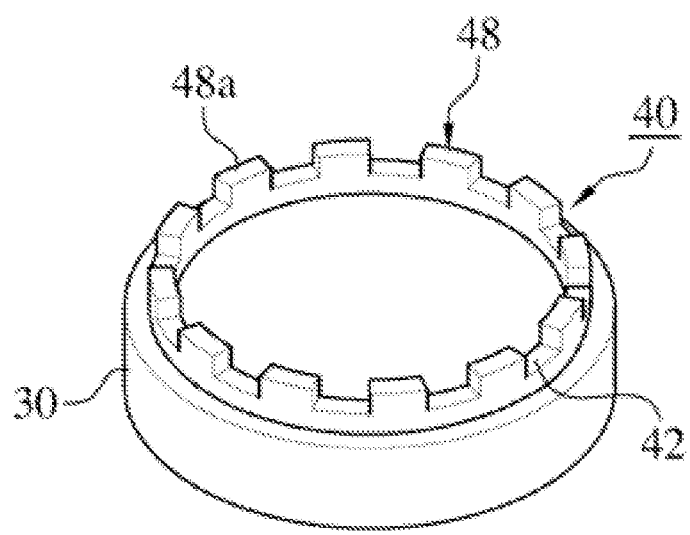

Referring to FIGS. 19A to 19C, when the glass solder 40 is heated to a softening temperature after the exhaust of an air from the plate glass assembly 10 in the vacuum chamber or the vacuum oven, the glass solder 40 may be applied to the upper surface of the sealing cap 30 in various patterns 44, 46 and 48 that form at least one exhaust passage 42 between the exhaust hole 22 and the sealing cap 30. In some embodiments, the glass solder 40 may be applied to the glass panel assembly 10 around the exhaust hole 22.

Referring to FIG. 19A, the pattern 44 includes a first pattern 44a disposed closer to the edge of the sealing cap 30 and having at least one discontinuous section for forming the exhaust passage 42 and a second pattern 44b disposed farther from the edge of the sealing cap 30 than the first pattern 44a and arranged so as to be adjacent to the discontinuous section of the first pattern 44a. As shown in FIG. 19B, the pattern 46 includes a third pattern 46c formed so as to connect one end of a discontinuous section of a first pattern 46a to one end of a second pattern 46b to form the exhaust passage 42. As shown in FIG. 19C, the pattern 48 is formed by a serrated irregularity 48a having exhaust passages 42 at the edge of the sealing cap 30. When the sealing cap 30 is pressed against the periphery of the exhaust hole 22 in a state in which the glass solder 40 is heated and softened, the sealing cap 30 is brought into close contact with the lower surface of the lower glass panel 14, thereby closing the exhaust passage 42.

Referring to FIGS. 17, 18, 20 and 23, the cam mechanism 400 includes a cam shaft 402, a tappet 404 and a coil spring 406. The cam shaft 402 is composed of a shaft 402a and a cam 402b. Both ends of the shaft 402a are rotatably fitted to the shaft hole 66a of the joint plate 66 and the shaft hole 72a of the shaft bracket 72. As shown in detail in FIGS. 23A and 23B, the cam 402b is formed at the center of the outer surface of the shaft 402a. The cam 402b has a cam heel 402c and a cam lobe 402d protruding from one side of the cam heel 402c.

The tappet 404 or the cam follower is mounted between the holder 80 and the cam 402b. The upper portion of the tappet 404 is fitted to the bore 84, and the lower portion thereof is supported by the cam 402b. When the tappet 404 is supported on the cam heel 402c, the holder 80 and the tappet 404 are lowered so that the sealing cap 30 is separated from the lower glass panel 14. When the tappet 404 is supported by the cam lobe 402d, the holder 80 and the tappet 404 are lifted to press the sealing cap 30 against the lower surface of the lower glass panel 14. The holder 80 and the tappet 404 are made of a material such as oxygen-free copper, quartz glass or the like having thermal conductivity higher than the thermal conductivity of the portions making contact with the glass panel assembly 10, i.e., the lower plate 64 and the foot 70. The thermal conductivity of the portion making contact with the glass panel assembly 10 is set to be lower than the thermal conductivity of the holder 80 and the tappet 404 as the components for holding the sealing cap 30 to heat the glass solder 40, whereby it is possible to minimize damage to the glass panel assembly 10 due to the heat used when heating the glass solder 40.

A coil spring 406 is mounted inside the bore 84 so as to be interposed between the holder 80 and the tappet 404. The coil spring 406 absorbs the impact acting on the holder 80 and the tappet 404. In some embodiments, the coil spring 406 may elastically bias the holder 80 relative to the tappet 404 such that the sealing cap 30 located in the recess 82 comes into contact with the underside of the lower glass panel 14 by the elasticity of the coil spring 406.

Figure 18:
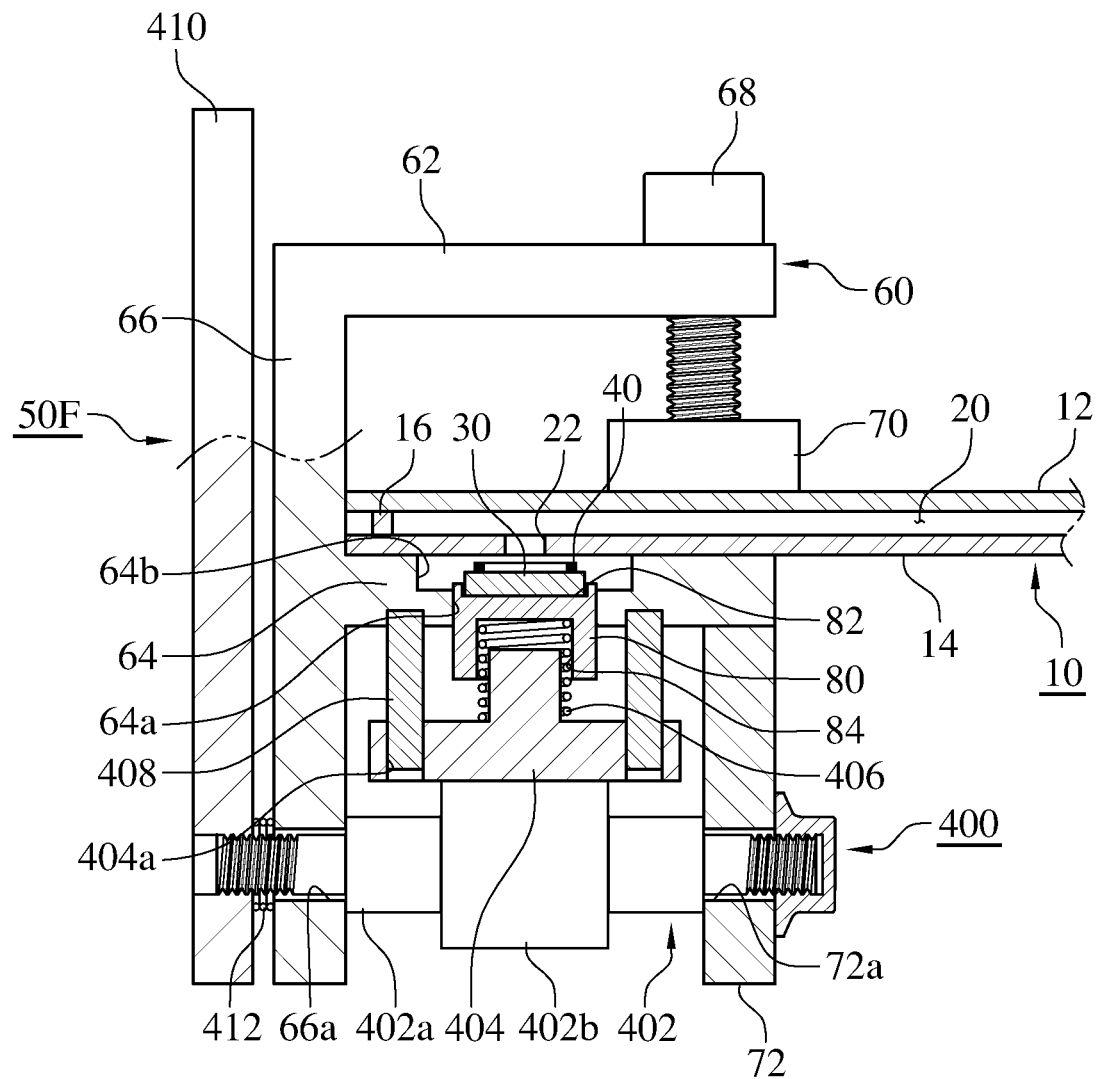
FIG. 18 is a front view partially showing the sealing cap closing apparatus of the sixth embodiment according to the present invention.
Figure 20:
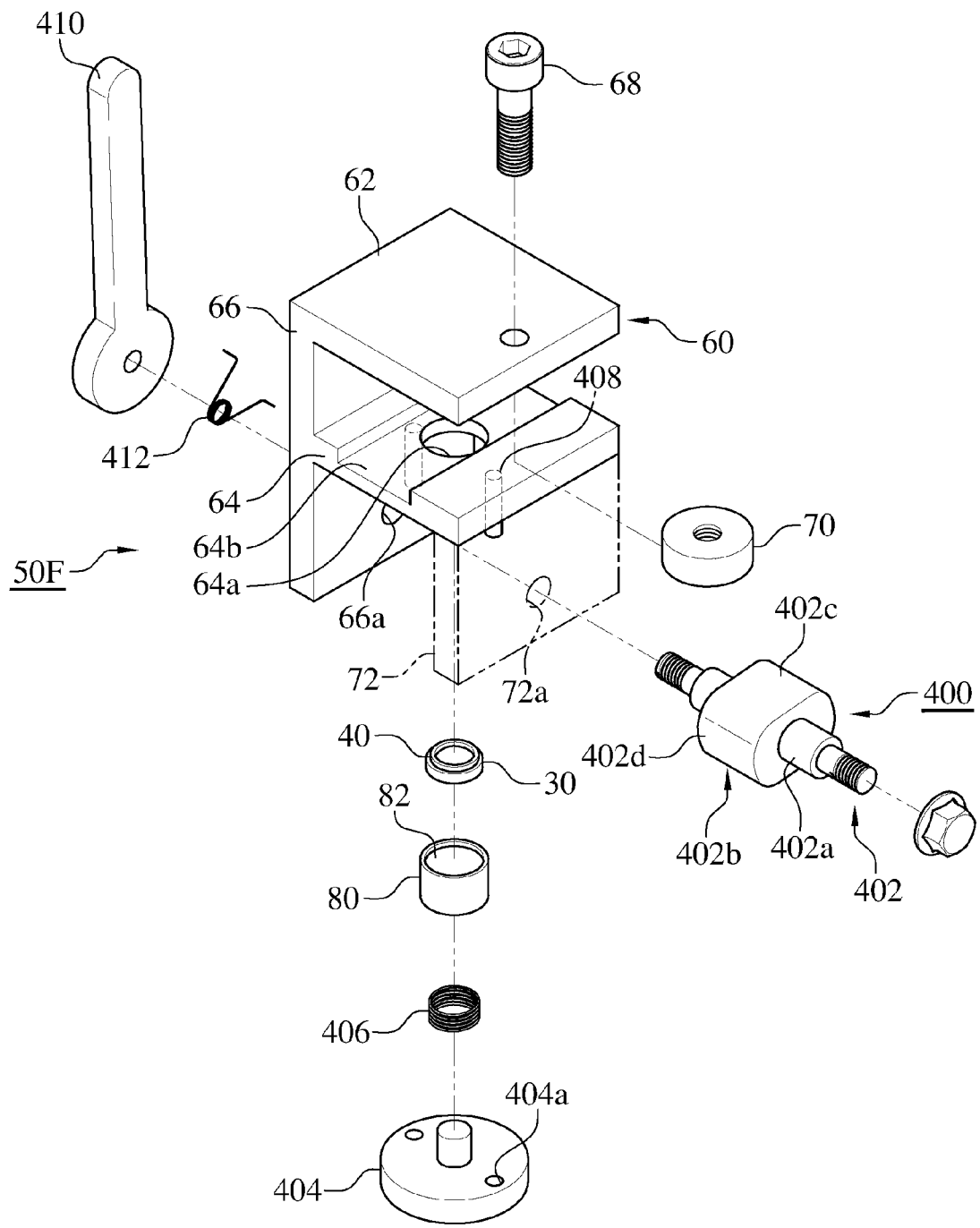
FIG. 20 is an exploded perspective view showing the sealing cap closing apparatus according to the sixth embodiment of the present invention.

Referring to FIGS. 18 and 20, the cam mechanism 400 further includes a pair of guide bars 408 as linear guides for guiding the lifting and lowering of the tappet 404. The guide bars 408 are vertically coupled to both sides of the lower plate 64. The guide bars 408 are fitted to a pair of guide holes 404a formed on both sides of the tappet 404 to guide the lifting and lowering of the tappet 404 in a linear motion. In some embodiments, the linear guide may be configured as a monorail type including a guide rail mounted on the lower plate 64 and a slider mounted on the tappet 404 so as to slide along the guide rail.

Figure 17:
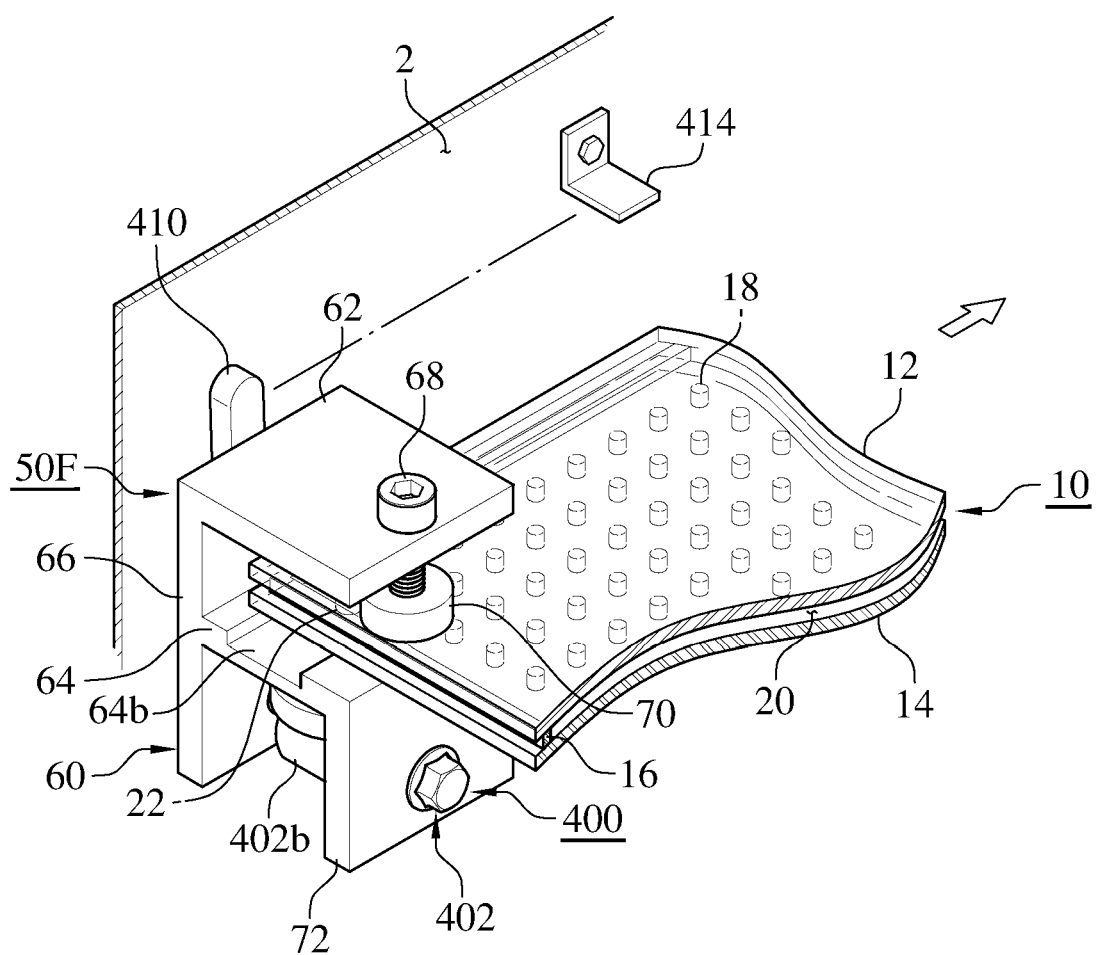
FIG. 17 is a perspective view showing a sealing cap closing apparatus according to a sixth embodiment of the present invention.

Referring to FIGS. 17, 18 and 20, the cam mechanism 400 further includes a handle 410 or a lever for rotating the cam shaft 402. The handle 110 is coupled to one end of the shaft 402a. A return spring 402 is mounted between the shaft 402a and the handle 410 so as to return the handle 410 to the initial position. The return spring 402 may be constituted by a torsion spring.

Figure 21:
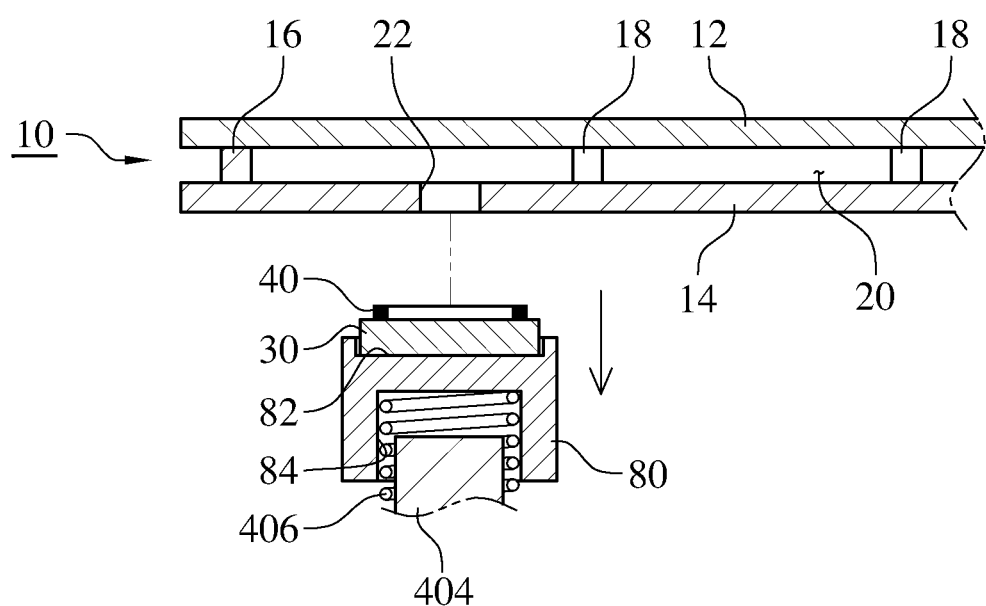
FIG. 21 is a partial sectional view for explaining the preparation state of the sealing cap in the sealing cap closing apparatus according to the sixth embodiment of the present invention.

Referring to FIGS. 17, 18 and 21, the sealing cap 30 to which the glass solder 40 is applied is seated in the recess 82 of the holder 80. The sealing cap closing apparatus 50F in which the sealing cap 30 is held by the holder 80 is clamped to the glass panel assembly 10 by the clamping unit 60. At the initial position of the handle 410, the tappet 404 is supported on the cam heel 402c, and the sealing cap 30 is separated from the exhaust hole 22.

Figure 22:
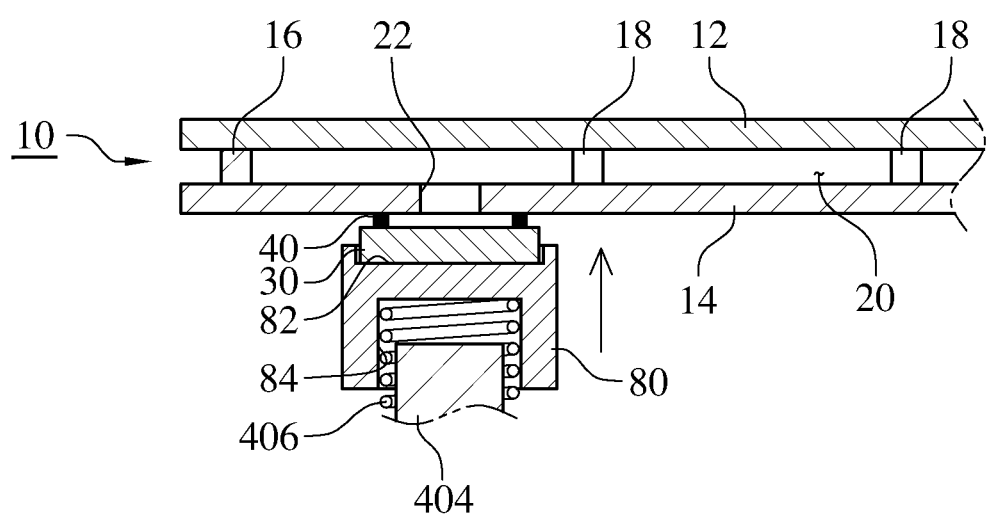
FIG. 22 is a partially cutaway front view showing the closed state of the sealing cap in the sealing cap closing apparatus according to the sixth embodiment of the present invention.
Figure 23A:
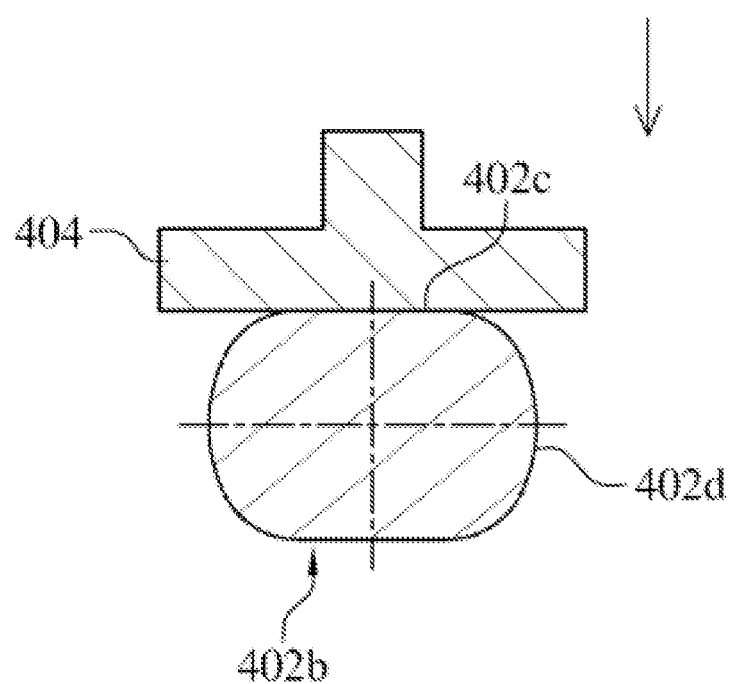
FIGS. 23A and 23B are partial front views for explaining the operation of a cam in the sealing cap closing apparatus according to the sixth embodiment of the present invention.
Figure 23B:
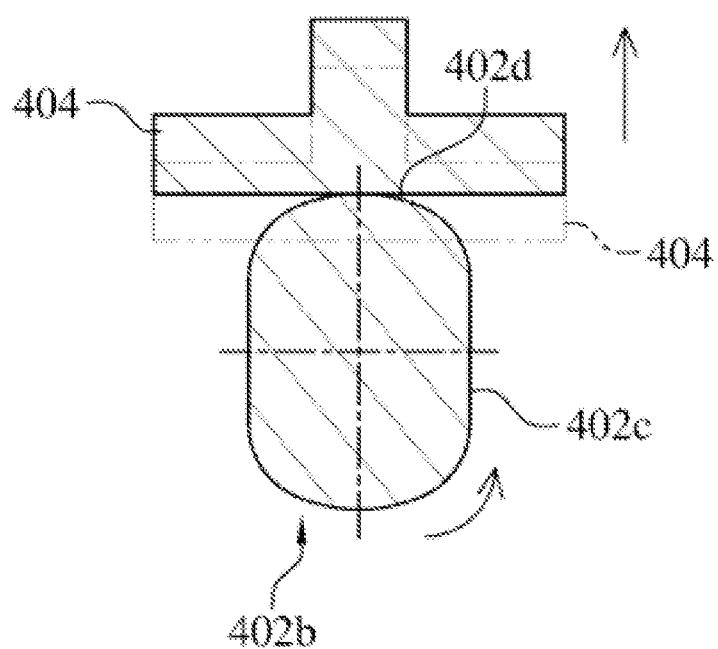

Referring to FIGS. 17, 22 and 23, the handle 410 of the cam mechanism 400 translated by the operation of the conveyor is caught and rotated by the dog 404, after the glass panel assembly 10 is put into the vacuum chamber 2 and an air is exhausted from the glass panel assembly 10. Rotation of the handle 410 causes rotation of the shaft 402. As shown in FIG. 7, upon rotation of the cam shaft 402, the tappet 404 supported on the cam heel 402c is lifted while being supported by the cam lobe 402d. As the tappet 404 is moved upward, the holder 80 is lifted along the guide hole 64a to press the sealing cap 30 against the periphery of the exhaust hole 22. As a result, the softened glass solder 40 is bonded to the periphery of the exhaust hole 22, whereby the sealing cap 30 completely closes the exhaust hole 22.

Subsequently, after the closing of the exhaust hole 22 by the sealing cap 30 is completed, the glass panel assembly 10 is discharged to the outside of the vacuum chamber 2 by the operation of the conveyor. The handle 410 is returned to the initial position by the elasticity of the return spring 402 as it moves past the dog 404. The cam shaft 402 is rotated due to the return of the handle 410 so that the tappet 404 is again supported on the cam heel 402c and the holder 80 is lowered together with the tappet 404 and returned to the initial position. As described above, the sealing cap 30 can be pressed against the periphery of the exhaust hole 22 by the operation of the cam mechanism 400 in the vacuum chamber 2. It is therefore possible to easily automate the manufacturing process of the glass panel assembly 10.

Figure 24:
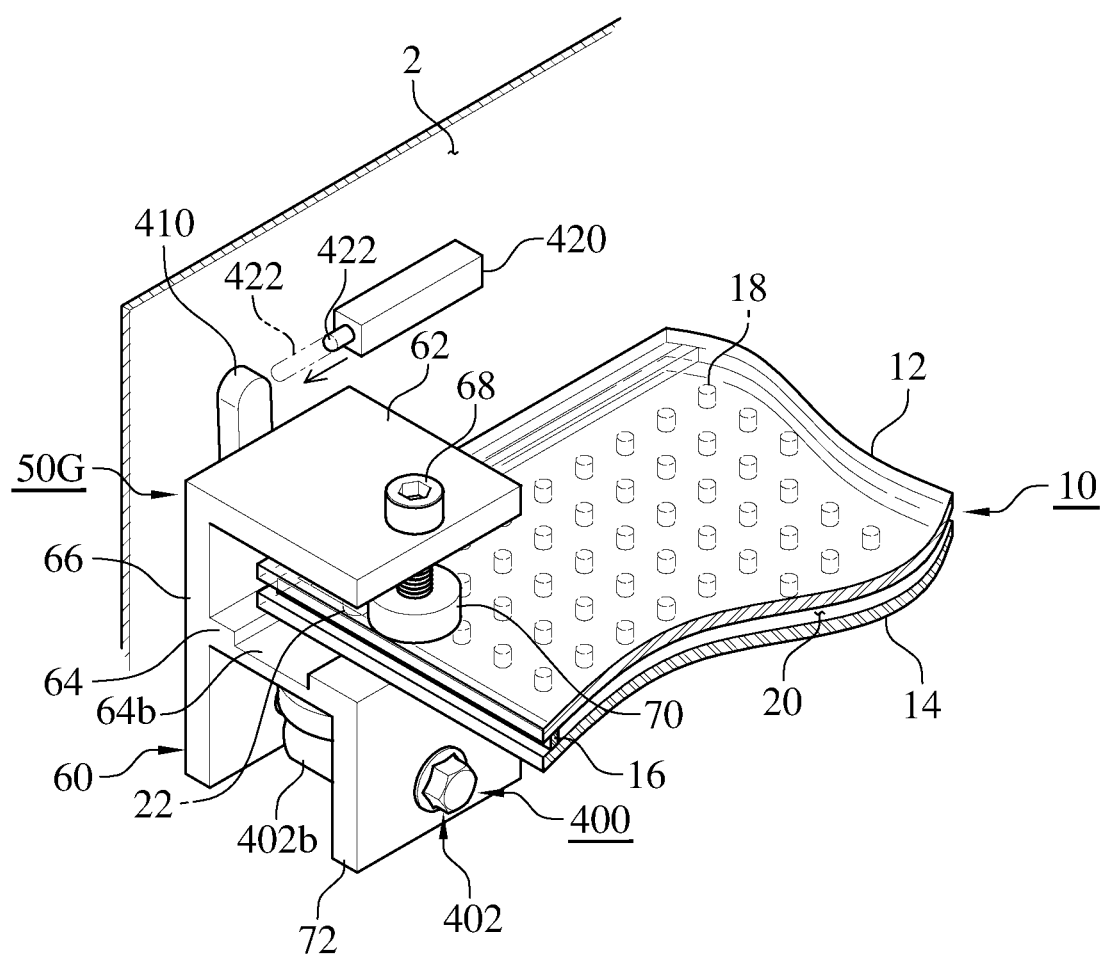
FIG. 24 is a perspective view showing a sealing cap closing apparatus according to a seventh embodiment of the present invention.

FIG. 24 shows a sealing cap closing apparatus according to a seventh embodiment of the present invention. Referring to FIG. 24, the difference between the sealing cap closing apparatus 50G of the seventh embodiment and the sealing cap closing apparatus 50F of the sixth embodiment described above is that an actuator 420 having a pusher 422 is mounted as a pushing actuator capable of rotating the handle 410 in the vacuum chamber 2.

When the vacuum chamber 2 is of a batch type, the glass panel assembly 10 put into the batch type vacuum chamber 2 does not make translational movement. After an air is exhausted from the glass panel assembly 10, the pusher 422 is advanced by the operation of the actuator 420 to rotate the handle 410. The cam shaft 402 and the tappet 404 are moved together by the rotation of the handle 410 so that the holder 80 is lifted to press the sealing cap 30 against the periphery of the exhaust hole 22 to close the exhaust hole 22. After the closing of the exhaust hole 22 by the sealing cap 30 is completed, the pusher 422 is moved backward by the operation of the actuator 420 to return the handle 410.

While the present invention has been described in connection with what is presently considered to be practical exemplary embodiments, it is to be understood that the invention is not limited to the embodiments described above. It will be understood by those skilled in the art that various changes, modifications, or substitutions may be made by those skilled in the art without departing from the spirit and scope of the invention.

What is claimed is:

1. A vacuum insulation glass panel sealing cap closing apparatus, comprising:
   a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
   a holder mounted in the guide hole so as to move along the guide hole and configured to hold a sealing cap to which a glass solder for closing the exhaust hole is applied; and
   an elevating device for moving the holder along the guide hole so as to press the sealing cap against a periphery of the exhaust hole so that the exhaust hole is closed by the sealing cap,
   wherein the clamping unit includes:
   an upper plate configured to be disposed above the glass panel assembly;
   a lower plate configured to be disposed below the glass panel assembly and having the guide hole formed therein; and
   a clamping screw fastened to the upper plate so as to support and clamp an upper surface of the glass panel assembly and having a foot configured to be coupled to a lower end of the glass panel assembly so as to make contact with the upper surface of the glass panel assembly.

2. The apparatus of claim 1, further comprising:
an exhaust passage formed in an upper surface of the lower plate so as to connect the exhaust hole and the guide hole.

3. The apparatus of claim 1, wherein the holder is configured to have a higher thermal conductivity than the lower plate and the foot making contact with the glass panel assembly.

4. A vacuum insulation glass panel sealing cap closing apparatus, comprising:
a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
a holder mounted in the guide hole so as to move along the guide hole and configured to hold a sealing cap to which a glass solder for closing the exhaust hole is applied; and
an elevating device for moving the holder along the guide hole so as to press the sealing cap against a periphery of the exhaust hole so that the exhaust hole is closed by the sealing cap,
wherein the elevating device includes:
a handle mounted on one side of the clamping unit so as to be rotatable;
a return spring configured to apply an elastic force to the handle so that the handle returns to an initial position;
a rack and pinion mechanism configured to convert a rotary motion of the handle into a linear motion and to transfer the linear motion to the holder to raise and lower the holder; and
a dog mounted on one side of a vacuum chamber so as to rotate the handle, the vacuum chamber configured to accommodate the glass panel assembly to exhaust an air from the glass panel assembly.

5. The apparatus of claim 4, wherein the rack and pinion mechanism includes a rack vertically movably arranged below the holder to raise and lower the holder, and a pinion mounted on the handle and engaged with the rack, and the elevating device further comprises:
a coil spring mounted between the holder and the rack; and
a linear guide configured to guide a linear motion of the rack.

6. A vacuum insulation glass panel sealing cap closing apparatus, comprising:
a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
a holder mounted in the guide hole so as to move along the guide hole and configured to hold a sealing cap to which a glass solder for closing the exhaust hole is applied; and
an elevating device for moving the holder along the guide hole so as to press the sealing cap against a periphery of the exhaust hole so that the exhaust hole is closed by the sealing cap,
wherein the elevating device includes:
a handle mounted on one side of the clamping unit so as to be rotatable;
a return spring configured to apply an elastic force to the handle so that the handle returns to an initial position;
a rack and pinion mechanism configured to convert a rotary motion of the handle into a linear motion and to transfer the linear motion to the holder to raise and lower the holder; and
a pushing actuator mounted on one side of a vacuum chamber so as to rotate the handle, the vacuum chamber configured to accommodate the glass panel assembly.

7. A vacuum insulation glass panel sealing cap closing apparatus, comprising:
a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
a holder mounted in the guide hole so as to move along the guide hole and configured to hold a sealing cap to which a glass solder for closing the exhaust hole is applied; and
an elevating device for moving the holder along the guide hole so as to press the sealing cap against a periphery of the exhaust hole so that the exhaust hole is closed by the sealing cap,
wherein the elevating device includes:
a lever mounted on one side of the clamping unit so as to be rotatable and having a pressing portion extending from a lower end portion thereof so as to raise and lower the holder;
a return spring configured to apply an elastic force to the handle so that the handle returns to an initial position; and
a dog mounted on one side of a vacuum chamber so as to rotate the lever, the vacuum chamber configured to accommodate the glass panel assembly.

8. A vacuum insulation glass panel sealing cap closing apparatus, comprising:
a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
a holder mounted in the guide hole so as to move along the guide hole and configured to hold a sealing cap to which a glass solder for closing the exhaust hole is applied; and
an elevating device for moving the holder along the guide hole so as to press the sealing cap against a periphery of the exhaust hole so that the exhaust hole is closed by the sealing cap,
wherein the elevating device includes:
a lever mounted on one side of the clamping unit so as to be rotatable and having a pressing portion extending from a lower end portion thereof so as to raise and lower the holder; and
a pushing actuator mounted on one side of a vacuum chamber so as to rotate the lever, the vacuum chamber configured to accommodate the glass panel assembly.

9. A vacuum insulation glass panel sealing cap closing apparatus, comprising:
a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;
a holder mounted in the guide hole so as to move along the guide hole and configured to hold a sealing cap to which a glass solder for closing the exhaust hole is applied; and an elevating device for moving the holder along the guide hole so as to press the sealing cap against a periphery of the exhaust hole so that the exhaust hole is closed by the sealing cap, wherein the elevating device includes:

a plunger fitted to the guide hole so as to vertically move along the guide hole to raise and lower the holder; and a pushing actuator mounted on one side of a vacuum chamber so as to vertically move the plunger, the vacuum chamber configured to accommodate the glass panel assembly.

10. The apparatus of claim 9, further comprising:

a coil spring mounted between the holder and the plunger; and a linear guide configured to guide a linear motion of the plunger.

11. The apparatus of claim 9, wherein the pushing actuator includes an actuator mounted in the vacuum chamber so as to be disposed below the glass panel assembly, and a pusher connected to the actuator so as to raise and lower the plunger, and further comprising:

a roller mounted on a lower end portion of the plunger so as to make rolling movement in contact with the pusher.

12. A vacuum insulation glass panel sealing cap closing apparatus, comprising:

a clamping unit configured to clamp an edge of a glass panel assembly at a position adjacent to an exhaust hole formed in one edge of a lower surface of the glass panel assembly, the clamping unit having a guide hole formed so as to be aligned with the exhaust hole;

a holder mounted in the guide hole so as to move along the guide hole and configured to hold a sealing cap to which a glass solder for closing the exhaust hole is applied; and an elevating device for moving the holder along the guide hole so as to press the sealing cap against a periphery of the exhaust hole so that the exhaust hole is closed by the sealing cap, wherein the elevating device includes:

a cam shaft rotatably mounted below the clamping unit, the cam shaft having a cam;

a tappet mounted between the holder and the cam to convert a rotary motion of the cam into a linear motion and transfer the linear motion to the holder; and a coil spring mounted between the holder and the tappet.

13. The apparatus of claim 12, further comprising:

a handle coupled to one side of the cam shaft so as to rotate the cam shaft; and a dog mounted on one side of a vacuum chamber so as to rotate the handle, the glass panel assembly put into the vacuum chamber while making translational movement so that an air is exhausted through the exhaust hole.

14. The apparatus of claim 12, further comprising:

a handle coupled to one side of the cam shaft so as to rotate the cam shaft; and an actuator having a pusher mounted on one side of a vacuum chamber so as to rotate the handle, the glass panel assembly put into the vacuum chamber so that an air is exhausted through the exhaust hole.

15. A vacuum insulation glass panel manufacturing method, comprising:

preparing a glass panel assembly having an exhaust hole formed in one of two glass panels with sealed edges;

applying a glass solder to a sealing cap for closing the exhaust hole;

causing the sealing cap to be held by a sealing cap closing apparatus for pressing the sealing cap against a periphery of the exhaust hole and then clamping the sealing cap closing apparatus to the glass panel assembly so that the sealing cap is disposed below the exhaust hole;

heating the glass solder so that the glass solder is softened;

putting the glass panel assembly into a vacuum chamber and then exhausting an air from the glass panel assembly; and bonding the glass solder to the periphery of the exhaust hole by pressing the sealing cap toward the exhaust hole by an operation of the sealing cap closing apparatus.

16. The method of claim 15, wherein the sealing cap closing apparatus includes an elevating device capable of moving the sealing cap toward the exhaust hole, the sealing cap closing apparatus is configured to translate the clamped glass panel assembly in the vacuum chamber, and the act of bonding the glass solder is configured to press the sealing cap toward the exhaust hole by the operation of the elevating device after the act of exhausting the air.

\* \* \* \* \*